(12) United States Patent
Speight et al.

(10) Patent No.: US 12,388,563 B2
(45) Date of Patent: Aug. 12, 2025

(54) METHOD AND ARRANGEMENT FOR PROCESSING A SIGNAL

(71) Applicant: VEEA Inc., New York, NY (US)

(72) Inventors: Timothy James Speight, Monmouthshire (GB); Peter Bruce Darwood, Bradford (GB)

(73) Assignee: VEEA Inc., New York, NY (US)

( * ) Notice: Subject to any disclaimer, the term of this patent is extended or adjusted under 35 U.S.C. 154(b) by 354 days.

(21) Appl. No.: 17/993,499

(22) Filed: Nov. 23, 2022

(65) Prior Publication Data

US 2023/0163876 A1    May 25, 2023

Related U.S. Application Data

(60) Provisional application No. 63/282,431, filed on Nov. 23, 2021.

(51) Int. Cl.

| | |
|---|---|
| *H04L 1/00* | (2006.01) |
| *H04L 5/00* | (2006.01) |
| *H04W 4/06* | (2009.01) |
| *H04W 40/12* | (2009.01) |
| *H04L 12/18* | (2006.01) |
| *H04W 28/08* | (2023.01) |
| *H04W 84/18* | (2009.01) |

(52) U.S. Cl.
CPC .......... *H04L 1/0015* (2013.01); *H04L 1/0003* (2013.01); *H04L 5/0048* (2013.01);
(Continued)

(58) Field of Classification Search
CPC ....... H04L 1/00; H04L 1/0015; H04L 1/0001; H04L 1/0002; H04L 1/0003;
(Continued)

(56) References Cited

U.S. PATENT DOCUMENTS

| | | | |
|---|---|---|---|
| 2008/0232340 A1* | 9/2008 | Wan ...................... | H04L 1/0003 370/343 |
| 2017/0033950 A1* | 2/2017 | Houghton ............. | H04W 24/02 |

(Continued)

OTHER PUBLICATIONS

Couto, Douglas S.J.,et al., 'A High-Throughput Path Metric for Multi-Hop Wireless Routing' MobiCom '03, Sep. 14-19, 2003, San Diego, California, USA, https://pdos.csail.mit.edu/papers/grid:mobicom03/paper.pdf (13 pages).

(Continued)

*Primary Examiner* — Warner Wong
(74) *Attorney, Agent, or Firm* — Fitch, Even, Tabin & Flannery LLP

(57) ABSTRACT

A wireless communication unit to facilitate determining a plurality of communication link cost metrics at a receiving wireless communication unit using a multiple modulation and coding scheme, MCS, in a wireless mesh network, is described. A transmitter transmits sounding transmissions to at least two neighboring wireless communication units. A processor generates a sounding burst comprising: a plurality of multicast sounding transmissions that employ a different MCS; and a plurality of parameters contained at an application layer protocol level. The plurality of parameters comprises: an intra-burst sequence number for each MCS transmitted within each multicast sounding transmission; an indication of a number of sounding transmissions in the sounding burst; and an index value that references a particular table within a set of tables which is then used to determine a transmission bit rate, B, at the receiving unit for each multicast sounding transmission within the sounding burst.

20 Claims, 24 Drawing Sheets

(52) U.S. Cl.
CPC ............. *H04W 4/06* (2013.01); *H04W 40/12* (2013.01); *H04L 12/189* (2013.01); *H04W 28/0958* (2020.05); *H04W 84/18* (2013.01)

(58) Field of Classification Search
CPC ..... H04L 5/0048; H04L 5/0051; H04L 12/16; H04L 12/18; H04L 12/189; H04L 27/0008; H04L 25/0226; H04L 25/03191; H04L 67/104; H04L 49/201; H04W 4/00; H04W 4/06; H04W 40/00; H04W 40/02; H04W 40/12; H04W 52/262; H04W 28/0958

See application file for complete search history.

(56) References Cited

U.S. PATENT DOCUMENTS

| | | | |
|---|---|---|---|
| 2018/0139679 A1* | 5/2018 | Åström | H04W 48/16 |
| 2022/0345187 A1* | 10/2022 | Merlin | H04B 7/0658 |

OTHER PUBLICATIONS

Choroboczek, J. et al., 'I Hear You' (IHU) message (see babel RFC6126/RFC 8966), https://www.rfc-editor.org/rfc/rfc8966.html, Jan. 2021 (45 Pages).

Draves, Richard et al., 'Routing in Multi-Radio, Multi-Hop Wireless Mesh Networks', MobiCom'04, Sep. 26-Oct. 1. 2004, Philadelphia, Pennsylvania, USA, https://www.cs.montana.edu/courses/spring2009/541/Ref/Draves-MobiCom04.pdf (15 pages).

Bicket, John et al., 'Architecture and Evaluation of an Unplanned 802.11b Mesh Network', MobiCom'05, Aug. 28-Sep. 2, 2005, Cologne, Germany, https://pdos.csail.mit.edu/papers/roofnet:mobicom05/roofnet-mobicom05.pdf (12 pages).

The new sub Type Length Value, TLV, encoding sounding transmission, Wikipedia the page was last edited on Feb. 4, 2023, https://en.wikipedia.org/wiki/Type%E2%80%93length%E2%80%93value#:~:text=Within%20communication%20protocols%2C%20TLV%20(type,and%20finally%20the%20value%20itself (3 pages).

* cited by examiner

MCS rate table index=0, $N_{burst}$ = 8

| | MCS0 | MCS1 | MCS2 | MCS3 | MCS4 | MCS5 | MCS6 | MCS7 |
|---|---|---|---|---|---|---|---|---|
| | 1 | 1 | 1 | 1 | 1 | 1 | 0 | 0 |
| | 1 | 1 | 1 | 1 | 1 | 0 | 0 | 0 |
| | 1 | 1 | 1 | 1 | 1 | 0 | 0 | 0 |
| | 1 | 1 | 1 | 1 | 1 | 0 | 0 | 0 |
| | 1 | 1 | 1 | 1 | 1 | 1 | 0 | 0 |
| | 1 | 1 | 1 | 1 | 0 | 1 | 0 | 0 |
| $PDR_{MCS}$ | 1 | 1 | 1 | 1 | 0.833 | 0.5 | 0 | 0 |
| $MCS\_rate\_cost_{MCS}$ | 40 | 20 | 13.3 | 10 | 6.66 | 5 | 4.44 | 4 |
| $Cost\_ETT_{MCS}$ | 40 | 20 | 13.3 | 10 | 8 | 10 | Inf | Inf |
| $Cost\_ETT$ | | | | | 8 | | | |

FIG. 9

Table 1 - standard MCS rate table for 802.11n

| MCS Index HT (802.11n) | Spatial Stream | Modulation | Coding | Bit rates in MBits/sec | | | |
|---|---|---|---|---|---|---|---|
| | | | | 20MHz BW | | 40 MHz BW | |
| | | | | 0.8μs GI | 0.4μs GI | 0.8μs GI | 0.4μs GI |
| 0 | 1 | BPSK | 1/2 | 6.50 | 7.22 | 13.50 | 15.00 |
| 1 | 1 | QPSK | 1/2 | 13.00 | 14.44 | 27.00 | 30.00 |
| 2 | 1 | QPSK | 3/4 | 19.50 | 21.67 | 40.50 | 45.00 |
| 3 | 1 | 16-QAM | 1/2 | 26.00 | 28.89 | 54.00 | 60.00 |
| 4 | 1 | 16-QAM | 3/4 | 39.00 | 43.33 | 81.00 | 90.00 |
| 5 | 1 | 64-QAM | 2/3 | 52.00 | 57.78 | 108.00 | 120.00 |
| 6 | 1 | 64-QAM | 3/4 | 58.50 | 65.00 | 121.50 | 135.00 |
| 7 | 1 | 64-QAM | 5/6 | 65.00 | 72.22 | 135.00 | 150.00 |
| 8 | 2 | BPSK | 1/2 | 13.00 | 14.44 | 27.00 | 30.00 |
| 9 | 2 | QPSK | 1/2 | 26.00 | 28.89 | 54.00 | 60.00 |
| 10 | 2 | QPSK | 3/4 | 39.00 | 43.33 | 81.00 | 90.00 |
| 11 | 2 | 16-QAM | 1/2 | 52.00 | 57.78 | 108.00 | 120.00 |
| 12 | 2 | 16-QAM | 3/4 | 78.00 | 86.67 | 162.00 | 180.00 |
| 13 | 2 | 64-QAM | 2/3 | 104.00 | 115.56 | 216.00 | 240.00 |
| 14 | 2 | 64-QAM | 3/4 | 117.00 | 130.00 | 243.00 | 270.00 |
| 15 | 2 | 64-QAM | 5/6 | 130.00 | 144.44 | 270.00 | 300.00 |
| 16 | 3 | BPSK | 1/2 | 19.50 | 21.67 | 40.50 | 45.00 |
| 17 | 3 | QPSK | 1/2 | 39.00 | 43.33 | 81.00 | 90.00 |
| 18 | 3 | QPSK | 3/4 | 58.50 | 65.00 | 121.50 | 135.00 |
| 19 | 3 | 16-QAM | 1/2 | 78.00 | 86.67 | 162.00 | 180.00 |
| 20 | 3 | 16-QAM | 3/4 | 117.00 | 130.00 | 243.00 | 270.00 |
| 21 | 3 | 64-QAM | 2/3 | 156.00 | 173.33 | 324.00 | 360.00 |
| 22 | 3 | 64-QAM | 3/4 | 175.50 | 195.00 | 364.50 | 405.00 |
| 23 | 3 | 64-QAM | 5/6 | 195.00 | 216.67 | 405.00 | 450.00 |
| 24 | 4 | BPSK | 1/2 | 26.00 | 28.89 | 54.00 | 60.00 |
| 25 | 4 | QPSK | 1/2 | 52.00 | 57.78 | 108.00 | 120.00 |
| 26 | 4 | QPSK | 3/4 | 78.00 | 86.67 | 162.00 | 180.00 |
| 27 | 4 | 16-QAM | 1/2 | 104.00 | 115.56 | 216.00 | 240.00 |
| 28 | 4 | 16-QAM | 3/4 | 156.00 | 173.33 | 324.00 | 360.00 |
| 29 | 4 | 64-QAM | 2/3 | 208.00 | 231.11 | 432.00 | 480.00 |
| 30 | 4 | 64-QAM | 3/4 | 234.00 | 260.00 | 486.00 | 540.00 |
| 31 | 4 | 64-QAM | 5/6 | 260.00 | 288.89 | 540.00 | 600.00 |

FIG. 15

Table 2 - standard MCS rate table for 802.11ac

| MCS Index VHT (802.11ac) | Spatial Stream | Modulation | Coding | Bit rates in MBits/sec | | | | | | | |
|---|---|---|---|---|---|---|---|---|---|---|---|
| | | | | 20 MHz BW | | 40 MHz BW | | 80 MHz BW | | 160 MHz | |
| | | | | 0.8μs GI | 0.4μs GI | 0.8μs GI | 0.4μs GI | 0.8μs GI | 0.4μs GI | 0.8μs GI | 0.4μs GI |
| 0 | 1 | BPSK | 1/2 | 6.50 | 7.22 | 13.50 | 15.00 | 29.25 | 32.50 | 58.50 | 65.00 |
| 1 | 1 | QPSK | 1/2 | 13.00 | 14.44 | 27.00 | 30.00 | 58.50 | 65.00 | 117.00 | 130.00 |
| 2 | 1 | QPSK | 3/4 | 19.50 | 21.67 | 40.50 | 45.00 | 87.75 | 97.50 | 175.50 | 195.00 |
| 3 | 1 | 16-QAM | 1/2 | 26.00 | 28.89 | 54.00 | 60.00 | 117.00 | 130.00 | 234.00 | 260.00 |
| 4 | 1 | 16-QAM | 3/4 | 39.00 | 43.33 | 81.00 | 90.00 | 175.50 | 195.00 | 351.00 | 390.00 |
| 5 | 1 | 64-QAM | 2/3 | 52.00 | 57.78 | 108.00 | 120.00 | 234.00 | 260.00 | 468.00 | 520.00 |
| 6 | 1 | 64-QAM | 3/4 | 58.50 | 65.00 | 121.50 | 135.00 | 263.25 | 292.50 | 526.50 | 585.00 |
| 7 | 1 | 64-QAM | 5/6 | 65.00 | 72.22 | 135.00 | 150.00 | 292.50 | 325.00 | 585.00 | 650.00 |
| 8 | 1 | 256-QAM | 3/4 | 78.00 | 86.67 | 162.00 | 180.00 | 351.00 | 390.00 | 702.00 | 780.00 |
| 9 | 1 | 256-QAM | 5/6 | | | 180.00 | 200.00 | 390.00 | 433.33 | 780.00 | 866.67 |
| 0 | 2 | BPSK | 1/2 | 13.00 | 14.44 | 27.00 | 30.00 | 58.50 | 65.00 | 117.00 | 130.00 |
| 1 | 2 | QPSK | 1/2 | 26.00 | 28.89 | 54.00 | 60.00 | 117.00 | 130.00 | 234.00 | 260.00 |
| 2 | 2 | QPSK | 3/4 | 39.00 | 43.33 | 81.00 | 90.00 | 175.50 | 195.00 | 351.00 | 390.00 |
| 3 | 2 | 16-QAM | 1/2 | 52.00 | 57.78 | 108.00 | 120.00 | 234.00 | 260.00 | 468.00 | 520.00 |
| 4 | 2 | 16-QAM | 3/4 | 78.00 | 86.67 | 162.00 | 180.00 | 351.00 | 390.00 | 702.00 | 780.00 |
| 5 | 2 | 64-QAM | 2/3 | 104.00 | 115.56 | 216.00 | 240.00 | 468.00 | 520.00 | 936.00 | 1040.00 |
| 6 | 2 | 64-QAM | 3/4 | 117.00 | 130.00 | 243.00 | 270.00 | 526.50 | 585.00 | 1053.00 | 1170.00 |
| 7 | 2 | 64-QAM | 5/6 | 130.00 | 144.44 | 270.00 | 300.00 | 585.00 | 650.00 | 1170.00 | 1300.00 |
| 8 | 2 | 256-QAM | 3/4 | 156.00 | 173.33 | 324.00 | 360.00 | 702.00 | 780.00 | 1404.00 | 1560.00 |
| 9 | 2 | 256-QAM | 5/6 | | | 360.00 | 400.00 | 780.00 | 866.67 | 1560.00 | 1733.33 |
| 0 | 3 | BPSK | 1/2 | 19.50 | 21.67 | 40.50 | 45.00 | 87.75 | 97.50 | 175.50 | 195.00 |
| 1 | 3 | QPSK | 1/2 | 39.00 | 43.33 | 81.00 | 90.00 | 175.50 | 195.00 | 351.00 | 390.00 |
| 2 | 3 | QPSK | 3/4 | 58.50 | 65.00 | 121.50 | 135.00 | 263.25 | 292.50 | 526.50 | 585.00 |
| 3 | 3 | 16-QAM | 1/2 | 78.00 | 86.67 | 162.00 | 180.00 | 351.00 | 390.00 | 702.00 | 780.00 |
| 4 | 3 | 16-QAM | 3/4 | 117.00 | 130.00 | 243.00 | 270.00 | 526.50 | 585.00 | 1053.00 | 1170.00 |
| 5 | 3 | 64-QAM | 2/3 | 156.00 | 173.33 | 324.00 | 360.00 | 702.00 | 780.00 | 1404.00 | 1560.00 |
| 6 | 3 | 64-QAM | 3/4 | 175.50 | 195.00 | 364.50 | 405.00 | | | 1579.50 | 1755.00 |
| 7 | 3 | 64-QAM | 5/6 | 195.00 | 216.67 | 405.00 | 450.00 | 877.50 | 975.00 | 1755.00 | 1950.00 |
| 8 | 3 | 256-QAM | 3/4 | 234.00 | 260.00 | 486.00 | 540.00 | 1053.00 | 1170.00 | 2106.00 | 2340.00 |
| 9 | 3 | 256-QAM | 5/6 | 260.00 | 288.89 | 540.00 | 600.00 | 1170.00 | 1300.00 | | |
| 0 | 4 | BPSK | 1/2 | 26.00 | 28.89 | 54.00 | 60.00 | 117.00 | 130.00 | 234.00 | 260.00 |
| 1 | 4 | QPSK | 1/2 | 52.00 | 57.78 | 108.00 | 120.00 | 234.00 | 260.00 | 468.00 | 520.00 |
| 2 | 4 | QPSK | 3/4 | 78.00 | 86.67 | 162.00 | 180.00 | 351.00 | 390.00 | 702.00 | 780.00 |
| 3 | 4 | 16-QAM | 1/2 | 104.00 | 115.56 | 216.00 | 240.00 | 468.00 | 520.00 | 936.00 | 1040.00 |
| 4 | 4 | 16-QAM | 3/4 | 156.00 | 173.33 | 324.00 | 360.00 | 702.00 | 780.00 | 1404.00 | 1560.00 |
| 5 | 4 | 64-QAM | 2/3 | 208.00 | 231.11 | 432.00 | 480.00 | 936.00 | 1040.00 | 1872.00 | 2080.00 |
| 6 | 4 | 64-QAM | 3/4 | 234.00 | 260.00 | 486.00 | 540.00 | 1053.00 | 1170.00 | 2106.00 | 2340.00 |
| 7 | 4 | 64-QAM | 5/6 | 260.00 | 288.89 | 540.00 | 600.00 | 1170.00 | 1300.00 | 2340.00 | 2600.00 |
| 8 | 4 | 256-QAM | 3/4 | 312.00 | 346.67 | 648.00 | 720.00 | 1404.00 | 1560.00 | 2808.00 | 3120.00 |

FIG. 16

Table 2 (cont'd) - standard MCS rate table for 802.11ac

| | | | | | | | | | | | |
|---|---|---|---|---|---|---|---|---|---|---|---|
| 9 | 4 | 256-QAM | 5/6 | | | 720.00 | 800.00 | 1560.00 | 1733.33 | 3120.00 | 3466.67 |
| 0 | 5 | BPSK | 1/2 | 32.50 | 36.11 | 67.50 | 75.00 | 146.25 | 162.50 | 292.50 | 325.00 |
| 1 | 5 | QPSK | 1/2 | 65.00 | 72.22 | 135.00 | 150.00 | 292.50 | 325.00 | 585.00 | 650.00 |
| 2 | 5 | QPSK | 3/4 | 97.50 | 108.33 | 202.50 | 225.00 | 438.75 | 487.50 | 877.50 | 975.00 |
| 3 | 5 | 16-QAM | 1/2 | 130.00 | 144.44 | 270.00 | 300.00 | 585.00 | 650.00 | 1170.00 | 1300.00 |
| 4 | 5 | 16-QAM | 3/4 | 195.00 | 216.67 | 405.00 | 450.00 | 877.50 | 975.00 | 1755.00 | 1950.00 |
| 5 | 5 | 64-QAM | 2/3 | 260.00 | 288.89 | 540.00 | 600.00 | 1170.00 | 1300.00 | 2340.00 | 2600.00 |
| 6 | 5 | 64-QAM | 3/4 | 292.50 | 325.00 | 607.50 | 675.00 | 1316.25 | 1462.50 | 2632.50 | 2925.00 |
| 7 | 5 | 64-QAM | 5/6 | 325.00 | 361.11 | 675.00 | 750.00 | 1462.50 | 1625.00 | 2925.00 | 3250.00 |
| 8 | 5 | 256-QAM | 3/4 | 390.00 | 433.33 | 810.00 | 900.00 | 1755.00 | 1950.00 | 3510.00 | 3900.00 |
| 9 | 5 | 256-QAM | 5/6 | | | 900.00 | 1000.00 | 1950.00 | 2166.67 | 3900.00 | 4333.33 |
| 0 | 6 | BPSK | 1/2 | 39.00 | 43.33 | 81.00 | 90.00 | 175.50 | 195.00 | 351.00 | 390.00 |
| 1 | 6 | QPSK | 1/2 | 78.00 | 86.67 | 162.00 | 180.00 | 351.00 | 390.00 | 702.00 | 780.00 |
| 2 | 6 | QPSK | 3/4 | 117.00 | 130.00 | 243.00 | 270.00 | 526.50 | 585.00 | 1053.00 | 1170.00 |
| 3 | 6 | 16-QAM | 1/2 | 156.00 | 173.33 | 324.00 | 360.00 | 702.00 | 780.00 | 1404.00 | 1560.00 |
| 4 | 6 | 16-QAM | 3/4 | 234.00 | 260.00 | 486.00 | 540.00 | 1053.00 | 1170.00 | 2106.00 | 2340.00 |
| 5 | 6 | 64-QAM | 2/3 | 312.00 | 346.67 | 648.00 | 720.00 | 1404.00 | 1560.00 | 2808.00 | 3120.00 |
| 6 | 6 | 64-QAM | 3/4 | 351.00 | 390.00 | 729.00 | 810.00 | 1579.50 | 1755.00 | 3159.00 | 3510.00 |
| 7 | 6 | 64-QAM | 5/6 | 390.00 | 433.33 | 810.00 | 900.00 | 1755.00 | 1950.00 | 3510.00 | 3900.00 |
| 8 | 6 | 256-QAM | 3/4 | 468.00 | 520.00 | 972.00 | 1080.00 | 2106.00 | 2340.00 | 4212.00 | 4680.00 |
| 9 | 6 | 256-QAM | 5/6 | 520.00 | 577.78 | 1080.00 | 1200.00 | | | 4680.00 | 5200.00 |
| 0 | 7 | BPSK | 1/2 | 45.50 | 50.56 | 94.50 | 105.00 | 204.75 | 227.50 | 409.50 | 455.00 |
| 1 | 7 | QPSK | 1/2 | 91.00 | 101.11 | 189.00 | 210.00 | 409.50 | 455.00 | 819.00 | 910.00 |
| 2 | 7 | QPSK | 3/4 | 136.50 | 151.67 | 283.50 | 315.00 | 614.25 | 682.50 | 1228.50 | 1365.00 |
| 3 | 7 | 16-QAM | 1/2 | 182.00 | 202.22 | 378.00 | 420.00 | 819.00 | 910.00 | 1638.00 | 1820.00 |
| 4 | 7 | 16-QAM | 3/4 | 273.00 | 303.33 | 567.00 | 630.00 | 1228.50 | 1365.00 | 2457.00 | 2730.00 |
| 5 | 7 | 64-QAM | 2/3 | 364.00 | 404.44 | 756.00 | 840.00 | 1638.00 | 1820.00 | 3276.00 | 3640.00 |
| 6 | 7 | 64-QAM | 3/4 | 409.50 | 455.00 | 850.50 | 945.00 | | | 3685.50 | 4095.00 |
| 7 | 7 | 64-QAM | 5/6 | 455.00 | 505.56 | 945.00 | 1050.00 | 2047.50 | 2275.00 | 4095.00 | 4550.00 |
| 8 | 7 | 256-QAM | 3/4 | 546.00 | 606.67 | 1134.00 | 1260.00 | 2457.00 | 2730.00 | 4914.00 | 5460.00 |
| 9 | 7 | 256-QAM | 5/6 | | | 1260.00 | 1400.00 | 2730.00 | 3033.33 | 5460.00 | 6066.67 |
| 0 | 8 | BPSK | 1/2 | 52.00 | 57.78 | 108.00 | 120.00 | 234.00 | 260.00 | 468.00 | 520.00 |
| 1 | 8 | QPSK | 1/2 | 104.00 | 115.56 | 216.00 | 240.00 | 468.00 | 520.00 | 936.00 | 1040.00 |
| 2 | 8 | QPSK | 3/4 | 156.00 | 173.33 | 324.00 | 360.00 | 702.00 | 780.00 | 1404.00 | 1560.00 |
| 3 | 8 | 16-QAM | 1/2 | 208.00 | 231.11 | 432.00 | 480.00 | 936.00 | 1040.00 | 1872.00 | 2080.00 |
| 4 | 8 | 16-QAM | 3/4 | 312.00 | 346.67 | 648.00 | 720.00 | 1404.00 | 1560.00 | 2808.00 | 3120.00 |
| 5 | 8 | 64-QAM | 2/3 | 416.00 | 462.22 | 864.00 | 960.00 | 1872.00 | 2080.00 | 3744.00 | 4160.00 |
| 6 | 8 | 64-QAM | 3/4 | 468.00 | 520.00 | 972.00 | 1080.00 | 2106.00 | 2340.00 | 4212.00 | 4680.00 |
| 7 | 8 | 64-QAM | 5/6 | 520.00 | 577.78 | 1080.00 | 1200.00 | 2340.00 | 2600.00 | 4680.00 | 5200.00 |
| 8 | 8 | 256-QAM | 3/4 | 624.00 | 693.33 | 1296.00 | 1440.00 | 2808.00 | 3120.00 | 5616.00 | 6240.00 |
| 9 | 8 | 256-QAM | 5/6 | | | 1440.00 | 1600.00 | 3120.00 | 3466.67 | 6240.00 | 6933.33 |

Table 3 (cont'd) - standard MCS rate table for 802.11ax

| 11 | 4 | 1024-QAM | 5/6 | 573.53 | 541.67 | 487.50 | 1147.06 | 1083.33 | 975.00 | 2401.96 | 2268.52 | 2041.67 | 4803.92 | 4537.04 | 4083.33 |
|---|---|---|---|---|---|---|---|---|---|---|---|---|---|---|---|
| 0 | 5 | BPSK | 1/2 | 43.01 | 40.63 | 36.56 | 86.03 | 81.25 | 73.13 | 180.15 | 170.14 | 153.13 | 360.29 | 340.28 | 306.25 |
| 1 | 5 | QPSK | 1/2 | 86.03 | 81.25 | 73.13 | 172.06 | 162.50 | 146.25 | 360.29 | 340.28 | 306.25 | 720.59 | 680.56 | 612.50 |
| 2 | 5 | QPSK | 3/4 | 129.04 | 121.88 | 109.69 | 258.09 | 243.75 | 219.38 | 540.44 | 510.42 | 459.38 | 1080.88 | 1020.83 | 918.75 |
| 3 | 5 | 16-QAM | 1/2 | 172.06 | 162.50 | 146.25 | 344.12 | 325.00 | 292.50 | 720.59 | 680.56 | 612.50 | 1441.18 | 1361.11 | 1225.00 |
| 4 | 5 | 16-QAM | 3/4 | 258.09 | 243.75 | 219.38 | 516.18 | 487.50 | 438.75 | 1080.88 | 1020.83 | 918.75 | 2161.76 | 2041.67 | 1837.50 |
| 5 | 5 | 64-QAM | 2/3 | 344.12 | 325.00 | 292.50 | 688.24 | 650.00 | 585.00 | 1441.18 | 1361.11 | 1225.00 | 2882.35 | 2722.22 | 2450.00 |
| 6 | 5 | 64-QAM | 3/4 | 387.13 | 365.63 | 329.06 | 774.26 | 731.25 | 658.13 | 1621.32 | 1531.25 | 1378.13 | 3242.65 | 3062.50 | 2756.25 |
| 7 | 5 | 64-QAM | 5/6 | 430.15 | 406.25 | 365.63 | 860.29 | 812.50 | 731.25 | 1801.47 | 1701.39 | 1531.25 | 3602.94 | 3402.78 | 3062.50 |
| 8 | 5 | 256-QAM | 3/4 | 516.18 | 487.50 | 438.75 | 1032.35 | 975.00 | 877.50 | 2161.76 | 2041.67 | 1837.50 | 4323.53 | 4083.33 | 3675.00 |
| 9 | 5 | 256-QAM | 5/6 | 573.53 | 541.67 | 487.50 | 1147.06 | 1083.33 | 975.00 | 2401.96 | 2268.52 | 2041.67 | 4803.92 | 4537.04 | 4083.33 |
| 10 | 5 | 1024-QAM | 3/4 | 645.22 | 609.38 | 548.44 | 1290.44 | 1218.75 | 1096.88 | 2702.21 | 2552.08 | 2296.88 | 5404.41 | 5104.17 | 4593.75 |
| 11 | 5 | 1024-QAM | 5/6 | 716.91 | 677.08 | 609.38 | 1433.82 | 1354.17 | 1218.75 | 3002.45 | 2835.65 | 2552.08 | 6004.90 | 5671.30 | 5104.17 |
| 0 | 6 | BPSK | 1/2 | 51.62 | 48.75 | 43.88 | 103.24 | 97.50 | 87.75 | 216.18 | 204.17 | 183.75 | 432.35 | 408.33 | 367.50 |
| 1 | 6 | QPSK | 1/2 | 103.24 | 97.50 | 87.75 | 206.47 | 195.00 | 175.50 | 432.35 | 408.33 | 367.50 | 864.71 | 816.67 | 735.00 |
| 2 | 6 | QPSK | 3/4 | 154.85 | 146.25 | 131.63 | 309.71 | 292.50 | 263.25 | 648.53 | 612.50 | 551.25 | 1297.06 | 1225.00 | 1102.50 |
| 3 | 6 | 16-QAM | 1/2 | 206.47 | 195.00 | 175.50 | 412.94 | 390.00 | 351.00 | 864.71 | 816.67 | 735.00 | 1729.41 | 1633.33 | 1470.00 |
| 4 | 6 | 16-QAM | 3/4 | 309.71 | 292.50 | 263.25 | 619.41 | 585.00 | 526.50 | 1297.06 | 1225.00 | 1102.50 | 2594.12 | 2450.00 | 2205.00 |
| 5 | 6 | 64-QAM | 2/3 | 412.94 | 390.00 | 351.00 | 825.88 | 780.00 | 702.00 | 1729.41 | 1633.33 | 1470.00 | 3458.82 | 3266.67 | 2940.00 |
| 6 | 6 | 64-QAM | 3/4 | 464.56 | 438.75 | 394.88 | 929.12 | 877.50 | 789.75 | 1945.59 | 1837.50 | 1653.75 | 3891.18 | 3675.00 | 3307.50 |
| 7 | 6 | 64-QAM | 5/6 | 516.18 | 487.50 | 438.75 | 1032.35 | 975.00 | 877.50 | 2161.76 | 2041.67 | 1837.50 | 4323.53 | 4083.33 | 3675.00 |
| 8 | 6 | 256-QAM | 3/4 | 619.41 | 585.00 | 526.50 | 1238.82 | 1170.00 | 1053.00 | 2594.12 | 2450.00 | 2205.00 | 5188.24 | 4900.00 | 4410.00 |
| 9 | 6 | 256-QAM | 5/6 | 688.24 | 650.00 | 585.00 | 1376.47 | 1300.00 | 1170.00 | 2882.35 | 2722.22 | 2450.00 | 5764.71 | 5444.44 | 4900.00 |
| 10 | 6 | 1024-QAM | 3/4 | 774.26 | 731.25 | 658.13 | 1548.53 | 1462.50 | 1316.25 | 3242.65 | 3062.50 | 2756.25 | 6485.29 | 6125.00 | 5512.50 |
| 11 | 6 | 1024-QAM | 5/6 | 860.29 | 812.50 | 731.25 | 1720.59 | 1625.00 | 1462.50 | 3602.94 | 3402.78 | 3062.50 | 7205.88 | 6805.56 | 6125.00 |
| 0 | 7 | BPSK | 1/2 | 60.22 | 56.88 | 51.19 | 120.44 | 113.75 | 102.38 | 252.21 | 238.19 | 214.38 | 504.41 | 476.39 | 428.75 |
| 1 | 7 | QPSK | 1/2 | 120.44 | 113.75 | 102.38 | 240.88 | 227.50 | 204.75 | 504.41 | 476.39 | 428.75 | 1008.82 | 952.78 | 857.50 |
| 2 | 7 | QPSK | 3/4 | 180.66 | 170.63 | 153.56 | 361.32 | 341.25 | 307.13 | 756.62 | 714.58 | 643.13 | 1513.24 | 1429.17 | 1286.25 |
| 3 | 7 | 16-QAM | 1/2 | 240.88 | 227.50 | 204.75 | 481.76 | 455.00 | 409.50 | 1008.82 | 952.78 | 857.50 | 2017.65 | 1905.56 | 1715.00 |
| 4 | 7 | 16-QAM | 3/4 | 361.32 | 341.25 | 307.13 | 722.65 | 682.50 | 614.25 | 1513.24 | 1429.17 | 1286.25 | 3026.47 | 2858.33 | 2572.50 |
| 5 | 7 | 64-QAM | 2/3 | 481.76 | 455.00 | 409.50 | 963.53 | 910.00 | 819.00 | 2017.65 | 1905.56 | 1715.00 | 4035.29 | 3811.11 | 3430.00 |
| 6 | 7 | 64-QAM | 3/4 | 541.99 | 511.88 | 460.69 | 1083.97 | 1023.75 | 921.38 | 2269.85 | 2143.75 | 1929.38 | 4539.71 | 4287.50 | 3858.75 |
| 7 | 7 | 64-QAM | 5/6 | 602.21 | 568.75 | 511.88 | 1204.41 | 1137.50 | 1023.75 | 2522.06 | 2381.94 | 2143.75 | 5044.12 | 4763.89 | 4287.50 |
| 8 | 7 | 256-QAM | 3/4 | 722.65 | 682.50 | 614.25 | 1445.29 | 1365.00 | 1228.50 | 3026.47 | 2858.33 | 2572.50 | 6052.94 | 5716.67 | 5145.00 |
| 9 | 7 | 256-QAM | 5/6 | 802.94 | 758.33 | 682.50 | 1605.88 | 1516.67 | 1365.00 | 3362.75 | 3175.93 | 2858.33 | 6725.49 | 6351.85 | 5716.67 |
| 10 | 7 | 1024-QAM | 3/4 | 903.31 | 853.13 | 767.81 | 1806.62 | 1706.25 | 1535.63 | 3783.09 | 3572.92 | 3215.63 | 7566.18 | 7145.83 | 6431.25 |
| 11 | 7 | 1024-QAM | 5/6 | 1003.68 | 947.92 | 853.13 | 2007.35 | 1895.83 | 1706.25 | 4203.43 | 3969.91 | 3572.92 | 8406.86 | 7939.81 | 7145.83 |
| 0 | 8 | BPSK | 1/2 | 68.82 | 65.00 | 58.50 | 137.65 | 130.00 | 117.00 | 288.24 | 272.22 | 245.00 | 576.47 | 544.44 | 490.00 |
| 1 | 8 | QPSK | 1/2 | 137.65 | 130.00 | 117.00 | 275.29 | 260.00 | 234.00 | 576.47 | 544.44 | 490.00 | 1152.94 | 1088.89 | 980.00 |
| 2 | 8 | QPSK | 3/4 | 206.47 | 195.00 | 175.50 | 412.94 | 390.00 | 351.00 | 864.71 | 816.67 | 735.00 | 1729.41 | 1633.33 | 1470.00 |
| 3 | 8 | 16-QAM | 1/2 | 275.29 | 260.00 | 234.00 | 550.59 | 520.00 | 468.00 | 1152.94 | 1088.89 | 980.00 | 2305.88 | 2177.78 | 1960.00 |
| 4 | 8 | 16-QAM | 3/4 | 412.94 | 390.00 | 351.00 | 825.88 | 780.00 | 702.00 | 1729.41 | 1633.33 | 1470.00 | 3458.82 | 3266.67 | 2940.00 |
| 5 | 8 | 64-QAM | 2/3 | 550.59 | 520.00 | 468.00 | 1101.18 | 1040.00 | 936.00 | 2305.88 | 2177.78 | 1960.00 | 4611.76 | 4355.56 | 3920.00 |
| 6 | 8 | 64-QAM | 3/4 | 619.41 | 585.00 | 526.50 | 1238.82 | 1170.00 | 1053.00 | 2594.12 | 2450.00 | 2205.00 | 5188.24 | 4900.00 | 4410.00 |
| 7 | 8 | 64-QAM | 5/6 | 688.24 | 650.00 | 585.00 | 1376.47 | 1300.00 | 1170.00 | 2882.35 | 2722.22 | 2450.00 | 5764.71 | 5444.44 | 4900.00 |
| 8 | 8 | 256-QAM | 3/4 | 825.88 | 780.00 | 702.00 | 1651.76 | 1560.00 | 1404.00 | 3458.82 | 3266.67 | 2940.00 | 6917.65 | 6533.33 | 5880.00 |
| 9 | 8 | 256-QAM | 5/6 | 917.65 | 866.67 | 780.00 | 1835.29 | 1733.33 | 1560.00 | 3843.14 | 3629.63 | 3266.67 | 7686.27 | 7259.26 | 6533.33 |
| 10 | 8 | 1024-QAM | 3/4 | 1032.35 | 975.00 | 877.50 | 2064.71 | 1950.00 | 1755.00 | 4323.53 | 4083.33 | 3675.00 | 8647.06 | 8166.67 | 7350.00 |
| 11 | 8 | 1024-QAM | 5/6 | 1147.06 | 1083.33 | 975.00 | 2294.12 | 2166.67 | 1950.00 | 4803.92 | 4537.04 | 4083.33 | 9607.84 | 9074.07 | 8166.67 |

FIG. 17 (continued)

Table 4 - updated MCS rate table for 802.11n with relative cost values

| MCS Index HT (802.11n) | Spatial Stream | MCS$_{rate\_cost}$ |
|---|---|---|
| 0 | 1 | 40 |
| 1 | 1 | 20 |
| 2 | 1 | 13.333333 |
| 3 | 1 | 10 |
| 4 | 1 | 6.6666667 |
| 5 | 1 | 5 |
| 6 | 1 | 4.4444444 |
| 7 | 1 | 4 |
| 8 | 2 | 20 |
| 9 | 2 | 10 |
| 10 | 2 | 6.6666667 |
| 11 | 2 | 5 |
| 12 | 2 | 3.3333333 |
| 13 | 2 | 2.5 |
| 14 | 2 | 2.2222222 |
| 15 | 2 | 2 |
| 16 | 3 | 13.333333 |
| 17 | 3 | 6.6666667 |
| 18 | 3 | 4.4444444 |
| 19 | 3 | 3.3333333 |
| 20 | 3 | 2.2222222 |
| 21 | 3 | 1.6666667 |
| 22 | 3 | 1.4814815 |
| 23 | 3 | 1.3333333 |
| 24 | 4 | 10 |
| 25 | 4 | 5 |
| 26 | 4 | 3.3333333 |
| 27 | 4 | 2.5 |
| 28 | 4 | 1.6666667 |
| 29 | 4 | 1.25 |
| 30 | 4 | 1.1111111 |
| 31 | 4 | 1 |

FIG. 18

Table 5 - updated MCS rate table for 802.11ac with relative cost values

| MCS Index VHT (802.11ac) | Spatial Stream | $MCS_{rate\_cost}$ |
|---|---|---|
| 0 | 1 | 106.6667 |
| 1 | 1 | 53.33333 |
| 2 | 1 | 35.55556 |
| 3 | 1 | 26.66667 |
| 4 | 1 | 17.77778 |
| 5 | 1 | 13.33333 |
| 6 | 1 | 11.85185 |
| 7 | 1 | 10.66667 |
| 8 | 1 | 8.888889 |
| 9 | 1 | 8 |
| 0 | 2 | 53.33333 |
| 1 | 2 | 26.66667 |
| 2 | 2 | 17.77778 |
| 3 | 2 | 13.33333 |
| 4 | 2 | 8.888889 |
| 5 | 2 | 6.666667 |
| 6 | 2 | 5.925926 |
| 7 | 2 | 5.333333 |
| 8 | 2 | 4.444444 |
| 9 | 2 | 4 |
| 0 | 3 | 35.55556 |
| 1 | 3 | 17.77778 |
| 2 | 3 | 11.85185 |
| 3 | 3 | 8.888889 |
| 4 | 3 | 5.925926 |
| 5 | 3 | 4.444444 |
| 6 | 3 | 3.950617 |
| 7 | 3 | 3.555556 |
| 8 | 3 | 2.962963 |
| 9 | 3 | 2.666667 |
| 0 | 4 | 26.66667 |
| 1 | 4 | 13.33333 |
| 2 | 4 | 8.888889 |
| 3 | 4 | 6.666667 |
| 4 | 4 | 4.444444 |
| 5 | 4 | 3.333333 |
| 6 | 4 | 2.962963 |
| 7 | 4 | 2.666667 |
| 8 | 4 | 2.222222 |

FIG. 19

Table 5 (cont'd) - updated MCS rate table for 802.11ac with relative cost values

| | | |
|---|---|---|
| 9 | 4 | 2 |
| 0 | 5 | 21.33333 |
| 1 | 5 | 10.66667 |
| 2 | 5 | 7.111111 |
| 3 | 5 | 5.333333 |
| 4 | 5 | 3.555556 |
| 5 | 5 | 2.666667 |
| 6 | 5 | 2.37037 |
| 7 | 5 | 2.133333 |
| 8 | 5 | 1.777778 |
| 9 | 5 | 1.6 |
| 0 | 6 | 17.77778 |
| 1 | 6 | 8.888889 |
| 2 | 6 | 5.925926 |
| 3 | 6 | 4.444444 |
| 4 | 6 | 2.962963 |
| 5 | 6 | 2.222222 |
| 6 | 6 | 1.975309 |
| 7 | 6 | 1.777778 |
| 8 | 6 | 1.481481 |
| 9 | 6 | 1.333333 |
| 0 | 7 | 15.2381 |
| 1 | 7 | 7.619048 |
| 2 | 7 | 5.079365 |
| 3 | 7 | 3.809524 |
| 4 | 7 | 2.539683 |
| 5 | 7 | 1.904762 |
| 6 | 7 | 1.693122 |
| 7 | 7 | 1.52381 |
| 8 | 7 | 1.269841 |
| 9 | 7 | 1.142857 |
| 0 | 8 | 13.33333 |
| 1 | 8 | 6.666667 |
| 2 | 8 | 4.444444 |
| 3 | 8 | 3.333333 |
| 4 | 8 | 2.222222 |
| 5 | 8 | 1.666667 |
| 6 | 8 | 1.481481 |
| 7 | 8 | 1.333333 |
| 8 | 8 | 1.111111 |
| 9 | 8 | 1 |

FIG. 19 (continued)

Table 6 - updated MCS rate table for 802.11ax with relative cost values

| MCS Index HE (802.11ax) | Spatial Stream | $MCS_{rate\_cost}$ |
|---|---|---|
| 0 | 1 | 133.33333 |
| 1 | 1 | 66.666667 |
| 2 | 1 | 44.444444 |
| 3 | 1 | 33.333333 |
| 4 | 1 | 22.222222 |
| 5 | 1 | 16.666667 |
| 6 | 1 | 14.814815 |
| 7 | 1 | 13.333333 |
| 8 | 1 | 11.111111 |
| 9 | 1 | 10 |
| 10 | 1 | 8.8888889 |
| 11 | 1 | 8 |
| 0 | 2 | 66.666667 |
| 1 | 2 | 33.333333 |
| 2 | 2 | 22.222222 |
| 3 | 2 | 16.666667 |
| 4 | 2 | 11.111111 |
| 5 | 2 | 8.3333333 |
| 6 | 2 | 7.4074074 |
| 7 | 2 | 6.6666667 |
| 8 | 2 | 5.5555556 |
| 9 | 2 | 5 |
| 10 | 2 | 4.4444444 |
| 11 | 2 | 4 |
| 0 | 3 | 44.444444 |
| 1 | 3 | 22.222222 |
| 2 | 3 | 14.814815 |
| 3 | 3 | 11.111111 |
| 4 | 3 | 7.4074074 |
| 5 | 3 | 5.5555556 |
| 6 | 3 | 4.9382716 |
| 7 | 3 | 4.4444444 |
| 8 | 3 | 3.7037037 |
| 9 | 3 | 3.3333333 |
| 10 | 3 | 2.962963 |
| 11 | 3 | 2.6666667 |
| 0 | 4 | 33.333333 |
| 1 | 4 | 16.666667 |
| 2 | 4 | 11.111111 |
| 3 | 4 | 8.3333333 |
| 4 | 4 | 5.5555556 |
| 5 | 4 | 4.1666667 |
| 6 | 4 | 3.7037037 |
| 7 | 4 | 3.3333333 |
| 8 | 4 | 2.7777778 |
| 9 | 4 | 2.5 |
| 10 | 4 | 2.2222222 |

FIG. 20

Table 6 (cont'd) - updated MCS rate table for 802.11ax with relative cost values

| | | |
|---|---|---|
| 11 | 4 | 2 |
| 0 | 5 | 26.666667 |
| 1 | 5 | 13.333333 |
| 2 | 5 | 8.8888889 |
| 3 | 5 | 6.6666667 |
| 4 | 5 | 4.4444444 |
| 5 | 5 | 3.3333333 |
| 6 | 5 | 2.962963 |
| 7 | 5 | 2.6666667 |
| 8 | 5 | 2.2222222 |
| 9 | 5 | 2 |
| 10 | 5 | 1.7777778 |
| 11 | 5 | 1.6 |
| 0 | 6 | 22.222222 |
| 1 | 6 | 11.111111 |
| 2 | 6 | 7.4074074 |
| 3 | 6 | 5.5555556 |
| 4 | 6 | 3.7037037 |
| 5 | 6 | 2.7777778 |
| 6 | 6 | 2.4691358 |
| 7 | 6 | 2.2222222 |
| 8 | 6 | 1.8518519 |
| 9 | 6 | 1.6666667 |
| 10 | 6 | 1.4814815 |
| 11 | 6 | 1.3333333 |
| 0 | 7 | 19.047619 |
| 1 | 7 | 9.5238095 |
| 2 | 7 | 6.3492063 |
| 3 | 7 | 4.7619048 |
| 4 | 7 | 3.1746032 |
| 5 | 7 | 2.3809524 |
| 6 | 7 | 2.1164021 |
| 7 | 7 | 1.9047619 |
| 8 | 7 | 1.5873016 |
| 9 | 7 | 1.4285714 |
| 10 | 7 | 1.2698413 |
| 11 | 7 | 1.1428571 |
| 0 | 8 | 16.666667 |
| 1 | 8 | 8.3333333 |
| 2 | 8 | 5.5555556 |
| 3 | 8 | 4.1666667 |
| 4 | 8 | 2.7777778 |
| 5 | 8 | 2.0833333 |
| 6 | 8 | 1.8518519 |
| 7 | 8 | 1.6666667 |
| 8 | 8 | 1.3888889 |
| 9 | 8 | 1.25 |
| 10 | 8 | 1.1111111 |
| 11 | 8 | 1 |

FIG. 20 (continued)

METHOD AND ARRANGEMENT FOR PROCESSING A SIGNAL

RELATED APPLICATION

This application claims the benefit of U.S. Provisional application No. 63/282,431, filed Nov. 23, 2022, which is incorporated by reference in its entirety herein.

TECHNICAL FIELD

The field of this invention relates generally to wireless communication technologies that employ a multi-modulation and coding scheme (MCS). In particular, the field of this invention relates to wireless mesh 802.11 WiFi™ networks and specifically a form of communication link estimate transmission time (ETT) cost metric that is often used in routing protocols used in MCS systems such as 802.11 WiFi™ networks.

BACKGROUND

A recent development in fourth generation (4G) and fifth generation (5G) wireless communications is the use of wireless mesh networks. Both of these technologies are compliant with third generation partnership project (3GPP™) standards.

In a wireless mesh network, where communications are often passed between many different entities (sometimes referred to as 'nodes'), data packets typically have an option of being transferred between a source entity or node and a destination entity or node via a number of alternative routes. Each respective communication between entities on the route is generally termed a 'hop'. It is known that in wireline networks a typical routing metric that is used is the number of hops, i.e., routes are selected that have the minimum number of hops, as this is often the most time-efficient and cost-efficient route. This works well in wireline networks because in a wireline system either a link between two nodes is available, in which case losses are minimal, or the link is not available and no data can pass. Thus, since neighboring nodes are by definition '1' hop away, the cost metric is always '1'.

However, using the 'number of hops' metric to select a preferred route in wireless networks can result in a poor performance, if routes that involve long paths with high loss rates are selected. Typically, wireless mesh networks use a re-transmission scheme at the medium access control (MAC) layer (e.g., 802.11 WiFi™) and the long links selected by the use of such a 'minimum hop count' metric will require a high rate of re-transmissions in order to send the data (i.e., they have a low delivery rate). Therefore, in many circumstances it can be found that it is better to select a route with more hops, where each of the hops requires fewer re-transmissions (i.e., each of the hops has a higher (successful) delivery rate).

In order for routing algorithms to select these kinds of 'more hops' routes, the expected number of transmissions (ETX) routing cost metric was developed, for example see 'A High-Throughput Path Metric for Multi-Hop Wireless Routing'—de Couto, Aguayo, Bicket, Morris (https://pdos.csail.mit.edu/papers/grid:mobicom03/paper.pdf).

The ETX cost metric captures a number of transmissions that are expected to be needed over each link, and therefore assigns high costs to long high-loss links. For example, a link between neighbors, where each data packet needed only one transmission (i.e., where no re-transmissions are needed), would have an ETX cost metric=1; whereas a link where each data packet requires two transmissions to be received by the neighbor would have an ETX cost=2.

The ETX metric is defined as:

$$\text{cost\_ETX} = \frac{1}{1-p} \qquad [1]$$

where p is the measured link loss rate.

Typically, the link loss rate p is measured by each node being configured to periodically send a multicast transmission (this is similar to a broadcast scenario, but where it is only received by a subset of nodes that have joined a specific multicast group). These transmitted multicast messages are typically referred to as 'hello' messages (see babel specification in RFC 6126/RFC8966). Nodes in the mesh network then record in a first-in first-out (FIFO) based history as to whether (or not) they have received the 'hello' message and then use the history to determine a loss rate p. So, for example, if nodes contain a history that records the last ten 'hello' transmissions, if five of those transmissions were recorded as being received and five of those transmissions were recorded as not having been received then a link loss rate, p in equation [1], would be 0.5.

Referring back now to equation [1] in this example, since the loss rate is 0.5 the ETX cost metric is calculated as '2', i.e., on average it takes 2 transmissions to send data over this communication link.

It is noteworthy that many wireless radio channels are not symmetric in nature, i.e., the communication losses in one wireless direction are not equal to the communication losses in the opposite direction between two nodes, then the loss rate is different from node 'A' to node 'B' than from Node 'B' to node 'A'. Thus, separate cost calculations should be made for a receiver (RX) cost and a transmitter (TX) cost, which are then used to determine an overall cost value. The value of ETX_cost determined above is effectively a RX cost from a particular node. The total link cost is calculated by sending back calculated value of ETX back to a neighbor node in a unicast (i.e., not broadcast/multicast) transmission, which then becomes a TX cost for the node that receives this information. The message used to convey this information is often referred to as an 'I Hear You' (IHU) message (see babel RFC6126/RFC 8966). This provides each node with a TX and RX cost for each link, which can then be used to determine an overall link cost as shown below in equation [2].

$$\text{total}_{cost} = tx\text{cost} * rx\text{cost} \qquad [2]$$

The ETX measure then creates a cost per link and the total summation of all ETX values for each hop in the link provides a measure for the total cost. Routing algorithms located in all devices within the mesh can then be used to find the best route through the mesh network (i.e., the route having the lowest summation of ETX values). The cost metric will be used in a routing algorithm to determine the best route through the wireless mesh to the intended destination.

The use of the ETX measurement provides significant benefits compared to a simple hop count metric in wireless mesh networks, as illustrated in the example 100 shown in FIG. 1. In FIG. 1 a total of five nodes 110, 120, 130, 140, 150 are shown in a wireless mesh network. Node 1 110 is a sink node that contains a wired connection to the internet 160 and thereafter to database 170. In this example the goal is to send data between node 5 150 and the sink node, node 1 110. In 802.11 broadcast and multicast transmissions are typically associated with the lowest MCS (modulation and coding scheme). Thus, the measurements of link loss rate in FIG. 1 are for the 6.5 Mbps rate which is typically the lowest MCS (802.11n MCS0). In this example, there are three possible links:

A direct link 115 between node 5 150 and node 1 110. This single link has a loss rate of 0.8;

A two-hop link 125 using node 2 120. Each link in this case has a loss rate of 0.2;

A three-hop link 135 using node 3 130 and node 4 140. Each link in this case has a loss rate of 0.

A simple 'hop count' cost metric would choose the direct path, i.e., link 1 115 above. As determined in equation [1] above, it would take an expected five transmissions to reach node 1 110. However, if the ETX metric was employed, then the cost metric calculations for each possible link are: case (i) ETX=5, case (ii) ETX=1.25+1.25=2.5, case (iii) ETX=1+1+1=3

Thus, using the ETX metric the 2-hop path 125 via node 2 120 is selected requiring on average 2.5 transmissions to reach node 1 110.

Many wireless technologies (notably including 802.11 WiFi) employ a rate adaptation mechanism, by employing multiple modulation and coding schemes (MCS). This feature results in a problem associated with the ETX metric. As discussed above the link loss rate is effectively measured for the lowest rate within the set of allowed modulation and coding schemes. This will result in inefficient routes being selected as the routing metric will recommend a route based on the assumption of lowest MCS when other routes using higher rate MCS could be employed. Thus, for example using the ETX metric, routes selected would tend to employ a small number of long hops, which could only support a low MCS, as opposed to another possible route involving a larger number of shorter hops that employs a high MCS. So, for example ETX might pick a single hop that could support only 1 Mbps, but another route employing two hops at 10 Mbps may also exist and could provide better overall performance.

These problems, to some degree, were addressed in the development of the Estimate Transmission Time (ETT) cost metric, which is described in the document 'Routing in Multi-Radio, Multi-Hop Wireless Mesh Networks', authored by: Richard Draves, Jitendra Padhye, Brian Zill (https://www.cs.montana.edu/courses/spring2009/541/Ref/Draves-MobiCom04.pdf).

This ETT cost metric takes into account both the number of re-transmissions and the transmission bandwidth or bit rate (where the reference uses the term 'bandwidth B') in the communication link, using both of these two parameters to define how long it will take to transmit a packet. This metric is defined as [3]:

$$\text{cost\_}ETT = \frac{1}{1-p} * \frac{S}{B} = \text{cost\_}ETX * \frac{S}{B} \quad [3]$$

where S is the size of the packet that is to be sent and B is the available bandwidth or bit rate on the link.

Using this ETT cost metric may provide further gains over both the ETX and hop count metric as also illustrated in the example 100 of FIG. 1.

Thus, the communication system of FIG. 1 additionally includes a loss rate for different possible MCS, in this example associated with 802.11n (note that where a rate is not specified in a link a loss rate of 1 is observed). We assume the data packet size is 1500 bytes and thus, the ETT value for the direct link 115 between node 5 150 and node 1 110 (of FIG. 1) is:

$$\text{cost\_}ETT=(1/(1-0.8))*(1500*8/6.5E6)=0.0923.$$

Thus, the overall ETT is 0.0923 s.

The ETT value for the 2-hop link 125 via node 2 120 is the minimum of the three possible cost values (at 6.5 Mbps, 13 Mbps, 19.5 Mbps), which is at 13 Mbps and is:

$$\text{cost\_}ETT=(1/(1-0.4))*(1500*8/13E6)=0.01538.$$

However, there are two identical hops in this link 125 in this case, so the overall ETT is 0.0308 s.

The ETT value for the 3-hop link 135 via node 3 130 and node 4 140 is the minimum of the eight possible cost values (at 6.5 Mbps, 13 Mbps, 19.5 Mbps, 26 Mbps, 39 Mbps, 52 Mbps, 58.5 Mbps and 65 Mbps), which is at 58.5 Mbps and is:

$$\text{cost\_}ETT=(1/(1-0.3))*(1500*8/58.5E6)=0.000205.$$

However, there are three identical hops in this link 135, in this case, so the overall ETT is 0.000615 s.

Thus, using the ETT metric the 3-hop link 135 is chosen, which utilizes much higher rates than the 2-hop link 125 route obtained for the ETX metric. Specifically, the total ETT for the 2-hop link 125 route is 0.0308 s whereas the total ETT for the 3-hop link 135 route is 0.000615 s. Thus, the 3-hop link 135 route is more efficient of overall radio resources. It should be noted with regard to the above example, that the cost will not necessarily be the same for each hop of the communication link as shown in the simplified example of FIG. 1.

However, a key issue with the derivation of this ETT metric is the determination of the link loss rate p and the associated link bandwidth B (i.e., available transmission bit rate B on the communication link). As discussed above, broadcast transmissions typical default to using the lowest possible MCS (this is definitely the case in 802.11 WiFi). Therefore, if simple broadcast transmissions of 'hello' messages are used, then the determination of p will be at the lowest MCS. The bit rate B can be determined by sending test data and letting the built-in rate control algorithm with the radio system (typically 802.11 WiFi) run as normal. This clearly will provide a good estimate of B for a link but if it is used in conjunction with p determined from a simple broadcast transmission at the lowest MCS the overall determination of the ETT metric will be incorrect.

The inventors of the present invention have recognized and appreciated that what is needed is a value of the loss rate p appropriate to a bit rate measure B, i.e., measured at the same MCS. Although it introduces the concept of ETT 'Routing in Multi-Radio, Multi-Hop Wireless Mesh Networks' (in the above-mentioned reference), it does not properly solve this issue.

In order to provide estimates of both p and B in the above equation that properly correspond to one another a modified sounding mechanism is needed.

The basic sounding functionality associated with an ETX metric determination as described in the babel (RFC6126/RFC 8966) is shown in the example 200 of FIG. 2. As can be seen a sequence number is assigned to the sounding message, referred to as a 'hello' message in the babel standard, that is incremented for each sounding transmission. The hello message also contains an indication of the hello interval (marked as τ 210 in FIG. 3). A flag is used to indicate whether this is a unicast or multicast message and a length indicator.

The document titled 'Architecture and Evaluation of an Unplanned 802.11b Mesh Network', authored by John Bicket, Daniel Aguayo, Sanjit Biswas, Robert Morris, and obtainable at: https://pdos.csail.mit.edu/papers/roofnet:mobicom05/roofnet-mobicom05.pdf suggests a use of beacon transmissions at multiple different bit rates 310, as shown in the sounding burst 300 of FIG. 3. The document provides a very basic description of a formulation of a sounding mechanism, whereby each MCS is tried in turn as part of a burst and these are then used to determine an ETT metric based on their rate of reception by neighboring nodes. The approach provides a value of p for each bit rate and thus there are fully corresponding values in the determination of the route metric on each link. However, a skilled artisan appreciates that 802.11b is a very old standard and more modern implementations have considerably more possible bit rates that can be utilized.

However, it is noted (as shown in the title of the paper) that this refers only to the simple case of 802.11b. In this case there are a very limited number of possible MCS (specifically only 4-bit rates are possible in this case 1 Mbps, 2 Mbps, 5.5 Mbps and 11 Mbps) and possible implementation options do not affect this limited set of bit rates. It is clear from this paper that there are a number of key issues remaining:

Without a standardized format to the sounding packets by which the exact MCS that is being used can be easily determined at application layer (i.e., the protocol layer on which the routing functionality is implemented) it will be difficult to track which of the particular MCS sounding packets have been received and which have not. This is particularly true as the number of MCS grows in more modern WiFi implementations (as mentioned above 802.11b in the Bicket paper only employs 4 different MCS).

The actual set of MCS that are to be used in the sounding sequence needs to be understood across the whole population of nodes in the mesh network. This is particularly the case given that there are many options that exist within more recent versions of 802.11 WiFi™, which affect the MCS that is used. So, for instance in 802.11n (developed in 2009 so not particularly modern either) options that will affect both the number of possible MCS that can be employed and the rate of each MCS would be: whether short or long guard intervals are used, whether 64 QAM is supported and how many spatial streams can be used. Given this situation, the inventors have recognized and appreciated that a mechanism is required for all mesh nodes to have knowledge (at a higher protocol layer) of the MCSs that are to be used in the sounding process.

As mentioned above a number of versions of the 802.11 standard are now typically implemented, e.g., 802.11n, 802.11ac and 802.11ax. Table 1 illustrates a standard MCS rate table for 802.11n. Table 2 illustrates a standard MCS rate table for 802.11ac. Table 3 illustrates a standard MCS rate table for 802.11ax. The inventors have recognized and appreciated that a mechanism is required by which all these versions can be supported easily when determining the ETT parameter.

Thus, there exists a need to provide an improved routing selection mechanism, particularly for wireless mesh networks that are compliant with 802.11 WiFi networks.

SUMMARY OF THE INVENTION

In a first aspect of the invention, a wireless communication unit for determining a plurality of link costs for communications to a receiving wireless communication unit using a multiple modulation and coding scheme, MCS in a wireless mesh network, is described. A transmitter transmits packets to at least two neighboring wireless communication units of a plurality of neighboring wireless communications units. A processor generates a sounding burst comprising: a plurality of multicast sounding transmissions, wherein each multicast sounding transmission employs a different MCS to be transmitted to the plurality of neighboring wireless communication units; and a plurality of parameters contained at an application layer protocol level. The plurality of parameters in the sounding burst comprises: an intra-burst sequence number for each MCS transmitted within each multicast sounding transmission; an indication of a number of packets in the sounding burst; and an index value that references a set of values that are specific to the wireless configuration that the wireless remote communications unit employs and used together with the intra-burst sequence number that identifies a specific sounding transmission within the sounding burst to determine a relative bit rate value associated with each multicast sounding transmission within the sounding burst.

In this manner, embodiments of the invention may allow a use of the ETT metric within a population of mesh nodes that employs a diversity of modern versions of 802.11 e.g., 802.11n and 802.11ac. These have many different MCS and many different implementation options affecting the MCS that they can support. This approach is in contrast to known techniques whereby there is no current mechanism (or possibility) for the mesh nodes to obtain a full understanding of the MCSs that are being used in the sounding bursts, and therefore makes it impossible to employ the ETT metric in a routing algorithm. In this manner, examples described herein further allow ETT metrics to be determined when multiple 802.11 versions are used (together with multiple options within the versions). Furthermore, examples described herein provide an efficient means for sounding histories over multiple MCS to be maintained. Additionally, examples described herein may remove a need to know a sounding transmission packet size when determining ETT metrics.

In an optional example, a mechanism is provided that ties together whether certain sounding transmissions have been received at which MCS, which may be performed at the application layer. In this manner, having this information directly available to the routing protocol via the application layer, simplifies functionality considerably and enables a direct link between a higher layer packet and what MCS was used at the physical layer. Ensuring that parameters needed to correctly measure link cost, i.e., the parameters contained in the sounding burst as described herein, are available at the same protocol layer as the routing protocol ensures that all functionality is contained in one protocol layer and ensures that cross layer functionality is not needed. Note that in many implementations programming access to physical layer is not possible and even in cases where it is tying together MCS used for transmissions along with appropriate acknowledge (ACK)/no acknowledge (NACK) reports is extremely challenging.

In an optional example, the processor may generate a further parameter contained at the application layer protocol level in the plurality multicast sounding transmissions of a sounding burst, wherein the further parameter may indicate a respective number of an individual multicast sounding transmission that is used in the sounding burst. In this manner, the examples may be backward compatible with existing/legacy systems and communication units. In an optional example, the number of individual multicast sounding transmissions that are used in the sounding burst may be a same number value across the plurality of multicast sounding transmissions.

In an optional example, the intra-burst sequence number for each MCS transmitted within each multicast sounding transmission may contain a non-consecutive MCS in each subsequent sounding transmission of the sounding burst.

In an optional example, the processor generated sequence number for each MCS transmitted within the plurality of multicast sounding transmissions at the application layer protocol level may be generated in a MCS rate table that is transmitted in each multicast sounding transmission. In an optional example, the MCS rate table may be indexed using a parameter that points to a particular table of a previously stored set of tables. In an optional example, the MCS rate table parameter may comprise a predefined set of MCS rate tables that may use a relative value between a peak bit rate and an individual bit rate contained in a MCS rate table together with predefined MCS rate table indexes. In an optional example, the MCS rate table parameter points to a previously defined 802.11 MCS rate table that enables the at least one neighboring wireless communication unit to calculate an Estimate Transmission Time, ETT, cost metric.

In an optional example, the processor may generate the sounding burst comprising the plurality of multicast sounding transmissions by including a sub Type Length Value, TLV, encoding sounding transmission that includes a legacy burst sequence number.

In a second aspect of the invention, a method for determining a plurality of link costs for communications to a receiving wireless communication unit in a wireless mesh network in a wireless communication unit configured to use a multiple modulation and coding scheme, MCS, is described. The method comprises: transmitting sounding transmissions to at least two neighboring wireless communication units of a plurality of neighboring wireless communications units, wherein the wireless mesh network comprises the at least two neighboring wireless communication units forming a respective communication path between the wireless communication unit and the receiving wireless communication unit; and generating a sounding burst comprising a plurality of multicast sounding transmissions, wherein each multicast sounding transmission employs a different MCS to be transmitted to the plurality of neighboring wireless communication units; and a plurality of parameters contained at an application layer protocol level. The plurality of parameters in the sounding burst comprise: an intra-burst sequence number for each MCS transmitted within each multicast sounding transmission; an indication of a number of sounding transmissions in the sounding burst; and an index value that references a set of values that are specific to the wireless configuration that the wireless remote communications unit employs and used together with the intra-burst sequence number that identifies a specific sounding transmission within the sounding burst, to determine a relative bit rate value associated with each multicast sounding transmission within the sounding burst.

In a third aspect of the invention, a receiving wireless communication unit for determining a communication link cost metric from a sounding burst received from a transmitting wireless communication unit received via a plurality of communication links in a wireless mesh network, is described. The receiving wireless communication unit is configured to use a multiple modulation and coding scheme, MCS, and comprises: a receiver configured to receive sounding transmissions from at least two neighboring wireless communications units of a plurality of neighboring wireless communications units, wherein the wireless mesh network comprises the at least two neighboring wireless communication units forming a respective communication path between the transmitting wireless communication unit and the receiving wireless communication unit; and a processor coupled to the receiver and arranged to receive a sounding burst comprising a plurality of multicast sounding transmissions, wherein each multicast sounding transmission employs a different MCS from respective neighboring wireless communication units of the plurality of neighboring wireless communication units. Each multicast sounding transmission comprises a plurality of parameters contained at an application layer protocol level; wherein the plurality of parameters in the sounding burst comprises: an intra-burst sequence number for each MCS transmitted within each multicast sounding transmission; an indication of a number of sounding transmissions in the sounding burst; and an index value that references a set of values that are specific to the wireless configuration that the wireless remote communications unit employs and used together with the intra-burst sequence number that identifies a specific sounding transmission within the sounding burst to determine a relative bit rate value associated with each multicast sounding transmission within the sounding burst. The processor is configured to calculate a cost metric for a respective received sounding burst for each of the received sounding transmissions received via the plurality of communication links.

In an optional example, the processor may be configured to calculate an estimate transmission time (ETT) cost metric for the respective received sounding burst for each of the received sounding transmissions received via the plurality of communication links using a relative value between a peak bit rate and an individual bit rate contained in a MCS rate table.

In an optional example, the processor may be further configured to use a relative MCS rate table index contained in the sounding burst together with predefined rate table information to obtain a MCS rate cost metric for all MCS used in sounding burst. In an optional example, the processor may be further configured to derive a delivery rate from the parameters contained in the sounding transmission and use both the derived delivery rate and a MCS rate to derive a plurality of ETT cost metric values for each MCS used in the sounding burst.

In an optional example, the processor may be further configured to construct a sounding history of transmissions from the transmitting wireless communication unit received via the plurality of communication links using parameters in sounding burst. In an optional example, the processor may be further configured to derive a packet delivery rate for each MCS for each of the received sounding transmissions received via the plurality of communication links. In an optional example, the processor is coupled to a transmitter in the receiving wireless communication unit and the calculated cost metric is transmitted to at least one neighboring wireless communication unit for use by the neighboring wireless communication unit with a conventional routing algorithm to determine a performance for each of a plurality of routes through the wireless mesh network. In an optional example, the wireless mesh network may comply with at least one of: a WiFi™ 802.11n, a WiFi™ 802.11ac, a WiFi™ 802.11ax standard.

In a fourth aspect of the invention, a method for determining a plurality of link costs for communications in a wireless mesh network received at a receiving wireless communication unit configured to use a multiple modulation and coding scheme, MCS, is described. The method comprising: receiving sounding transmissions from at least two neighboring wireless communication units of a plurality of neighboring wireless communications units, wherein the wireless mesh network comprises the at least two neighboring wireless communication units forming a respective communication path between a transmitting wireless communication unit and the receiving wireless communication unit; and receiving and processing a sounding burst comprising a plurality of multicast sounding transmissions, wherein each multicast sounding transmission employs a different MCS from respective neighboring wireless communication units of the plurality of neighboring wireless communication units; and each multicast sounding transmission comprises a plurality of parameters contained at an application layer protocol level. The plurality of parameters in the sounding burst comprises: an intra-burst sequence number for each MCS transmitted within each multicast sounding transmission; an indication of a number of sounding transmissions in the sounding burst; and an index value that references a set of values that are specific to the wireless configuration that the wireless remote communications unit employs and used together with the intra-burst sequence number that identifies a specific sounding transmission within the sounding burst to determine a relative bit rate value associated with each multicast sounding transmission within the sounding burst. The method further comprises calculating a cost metric for the respective received sounding burst for each of the received sounding transmissions received via the plurality of communication links.

In a fifth aspect of the invention, a communication system comprises a wireless communication unit according to the first aspect and a receiving wireless communication unit according to the third aspect.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 9 illustrates an example of overall ETT cost calculation from sounding history and MCS rate table index, in accordance with some example embodiments of the invention.

FIG. 15 comprises a table.
FIG. 16 comprises a table.
FIG. 17 comprises a table.
FIG. 18 comprises a table.
FIG. 19 comprises a table.
FIG. 20 comprises a table.

Figure 1:
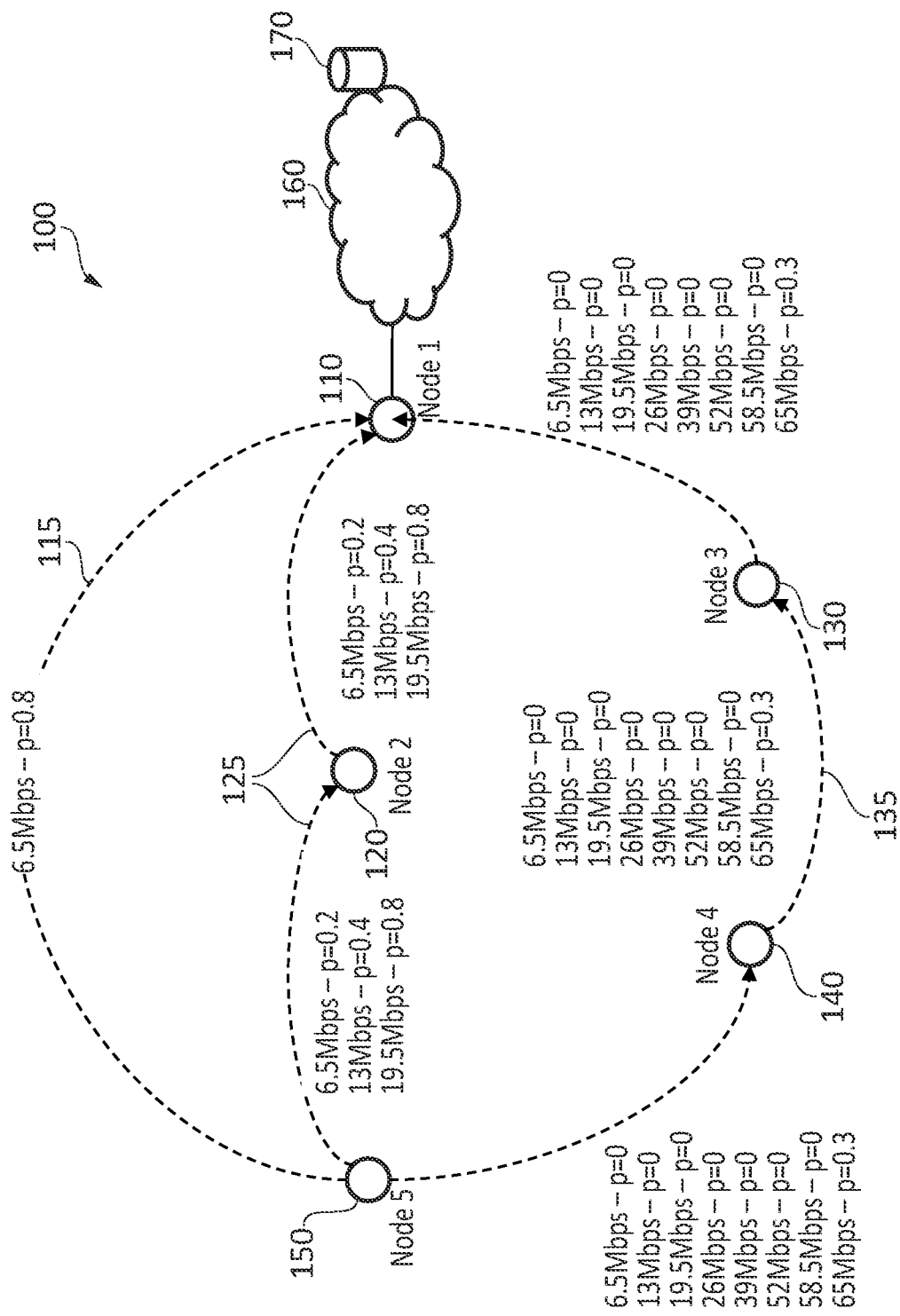
FIG. 1 illustrates an overview of a known wireless communication system that uses ETX measurements and a loss rate for different possible MCS to provide a benefit over a simple hop count metric in wireless mesh networks.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Examples of the invention propose an improved routing selection mechanism, particularly for wireless mesh networks that are compliant with 802.11 WiFi networks. Examples of the invention describe a wireless communication unit for determining a plurality of link costs for communications to a receiving wireless communication unit using a multiple modulation and coding scheme, MCS in a wireless mesh network. A transmitter transmits sounding transmissions to at least two neighboring wireless communication units of a plurality of neighboring wireless communications units. A processor generates a sounding burst comprising: a plurality of multicast sounding transmissions, wherein each multicast sounding transmission employs a different MCS to be transmitted to the plurality of neighboring wireless communication units; and a plurality of parameters contained at an application layer protocol level. The plurality of parameters in the sounding burst comprises: an intra-burst sequence number for each MCS transmitted within each multicast sounding transmission; an indication of a number of sounding transmissions in the sounding burst; and an index value that references a set of values that are specific to the wireless configuration that the wireless remote communications unit employs and used together with the intra-burst sequence number that identifies a specific sounding transmission within the sounding burst to determine a relative bit rate value associated with each multicast sounding transmission within the sounding burst. In this manner, the proposed mechanism is able to ensure that all mesh nodes have knowledge (at a higher protocol layer, such as the application layer) of the MCSs that are to be used in the sounding process.

In the context of the description, the term 'wireless communication unit' encompasses any wireless device that is able to be configured to support communications with one or more further wireless communication units in a wireless mesh network.

Although examples of the invention have been described with reference to 802.11 physical layer standards, it is envisaged that the examples herein described may be employed in any wireless communication system supports multi-MCS operation and can provide a means to support multicast functionality at all available MCS, which would result in a MCS rate table index pointing to a technology different from 802.11.

Figure 4:
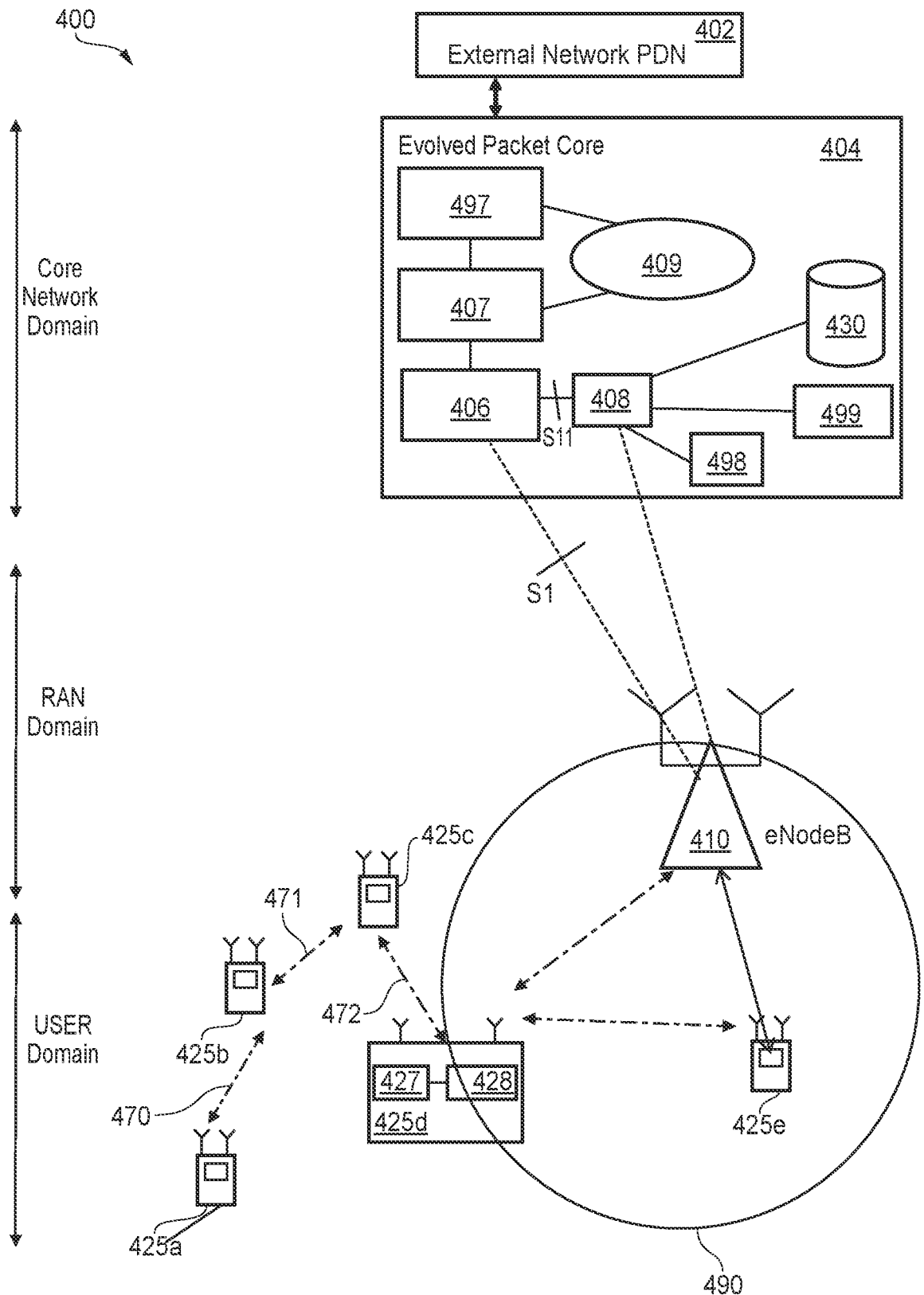
FIG. 4 illustrates an overview of a wireless communication system configured to provide an improved routing selection mechanism, particularly for wireless mesh networks that are compliant with 802.11 WiFi networks, in accordance with some example embodiments of the present invention.

Referring now to FIG. 4, a wireless communication system 400 is shown in outline, in accordance with one example embodiment of the invention. In this example embodiment, the wireless communication system 400 is compliant with, and contains network elements capable of operating over, a universal mobile telecommunication system (UMTS™) air-interface. In particular, the embodiment relates to a system's architecture for an Evolved-UMTS Terrestrial Radio Access Network (E-UTRAN) wireless communication system, which is currently under discussion in the third Generation Partnership Project (3GPP™) specification for long term evolution (LTE), based around OFDMA (Orthogonal Frequency Division Multiple Access) in the downlink (DL) and SC-FDMA (Single Carrier Frequency Division Multiple Access) in the uplink (UL), as described in the 3GPP™ TS 36.xxx series of specifications. Within LTE, both time division duplex (TDD) and frequency division duplex (FDD) modes are defined.

The wireless communication system 400 architecture consists of radio access network (RAN) and a core network (CN), sometimes referred to as an Evolved Packet System (EPS) 404, with core network elements being coupled to external packet networks 402 (named Packet Data Networks (PDNs)), such as the Internet or a corporate network. The CN elements comprise a packet data network gateway (P-GW) 407. In order to serve up local content, the P-GW may be coupled to a content provider. The P-GW 407 may be further coupled to a policy control and rules function entity (PCRF) 497 and a Gateway 406.

The PCRF 497 is operable to control policy control decision making, as well as for controlling the flow-based charging functionalities in a policy control enforcement function PCRF (not shown) that may reside in the P-GW 407. The PCRF 497 may further provide a quality of service (QoS) authorisation class identifier and bit rate information that dictates how a certain data flow will be treated in the PCRF 497 and ensures that this is in accordance with a wireless mesh node's 425 subscription profile.

In example embodiments, the Gateway 406 is a Serving Gateway (S-GW). The Gateway 406 is coupled to a mobility management entity MME 408 via an S11 interface. The MME 408 is operable to manage session control of Gateway bearers and is operably coupled to a home subscriber server (HSS) database 430 that is arranged to store wireless communication unit 425 (e.g., user equipment (UE)) related information. As illustrated, the MME 408 also has a direct connection to each eNodeB 410, via an S1-MME interface.

The HSS database 430 may store wireless mesh node subscription data such as QoS profiles and any access restrictions for roaming. The HSS database 430 may also store information relating to the P-GW 407 to which a wireless mesh node 425 can connect. For example, this data may be in the form of an access point name (APN) or a packet data network (PDN) address. In addition, the HSS database 430 may hold dynamic information relating to the identity of the MME 408 to which a wireless communication unit (such as wireless mesh node 425) is currently connected or registered.

The MME 408 may be further operable to control protocols running between the wireless communication unit, such as wireless mesh node 425 and the CN elements, which are commonly known as Non-Access Stratum (NAS) protocols. The MME 408 may support at least the following functions that can be classified as: functions relating to bearer management (which may include the establishment, maintenance and release of bearers), functions relating to connection management (which may include the establishment of the connection and security between the network and the wireless mesh node 425) and functions relating to interworking with other networks (which may include the handover of voice calls to legacy networks). The Gateway 406 predominantly acts as a mobility anchor point and is capable of providing internet protocol (IP) multicast distribution of user plane data to eNodeBs 410. The Gateway 406 may receive content via the P-GW 407, from one or more content providers 409 or via the external PDN 402. The MME 408 may be further coupled to an evolved serving mobile location center (E-SMLC) 498 and a gateway mobile location center (GMLC) 499.

The E-SMLC 498 is operable to manage the overall coordination and scheduling of resources required to find the location of the wireless mesh node that is attached to the RAN, in this example embodiment the E-UTRAN. The GMLC 499 contains functionalities required to support location services (LCS). After performing an authorization, it sends positioning requests to the MME 408 and receives final location estimates.

The P-GW 407 is operable to determine IP address allocation for a wireless mesh node 425, as well as QoS enforcement and flow-based charging according to rules received from the PCRF 497. The P-GW 407 is further operable to control the filtering of downlink user IP packets into different QoS-based bearers (not shown). The P-GW 407 may also serve as a mobility anchor for inter-working with non-3GPP technologies such as CDMA2000 and WiMAX networks.

As the Gateway 406 comprises an S-GW, the eNodeBs 410 would be connected to the S-GW 406 and the MME 408 directly. In this case, all packets would be transferred through the S-GW 406, which may serve as a local mobility anchor for the data bearers when a wireless mesh node 425 moves between eNodeBs 410. The S-GW 406 is also capable of retaining information about the bearers when the wireless mesh node 425 is in an idle state (known as EPS connection management IDLE), and temporarily buffers downlink data while the MME 408 initiates paging of the wireless mesh node 425 to re-establish the bearers. In addition, the S-GW 406 may perform some administrative functions in the visited network, such as collecting information for charging (i.e., the volume of data sent or received from the wireless mesh node 425). The S-GW 406 may further serve as a mobility anchor for inter-working with other 3GPP™ technologies such as the general packet radio system (GPRS™) and the universal mobile telecommunication system (UMTS™).

As illustrated, the EPS 404 is operably connected to two eNodeBs 410, with their respective coverage zones or cells 490 and a plurality of wireless mesh nodes 425 receiving transmissions from the EPS 404 via the eNodeBs 410. In accordance with example embodiments of the present invention, at least one eNodeB 410 and at least one wireless mesh node 425 (amongst other elements) have been adapted to support the concepts hereinafter described.

The main component of the RAN is an eNodeB (an evolved NodeB) 410, which performs many standard base station functions and is connected to the EPS 404 via an S1 interface and to the wireless mesh nodes 425 via a Uu interface. A wireless communication system will typically have a large number of such infrastructure elements where, for clarity purposes, only a limited number are shown in FIG. 4. The eNodeBs 410 control and manage the radio resource related functions for a plurality of wireless communication units/terminals (such as wireless mesh node 425). Each of the wireless mesh nodes 425 comprises at least a transceiver unit 427 operably coupled to signal processing logic (with one wireless mesh node illustrated in such detail for clarity purposes only). An example wireless mesh node 425 is illustrated in greater detail in FIG. 5 The system comprises many other wireless mesh nodes 425 and eNodeBs 410, which for clarity purposes are not shown.

In examples of the invention, a number of wireless mesh nodes 425 have been adapted to include additional information within each transmitted WiFi™ message 470, 471, 472 of a sounding burst in order to provide the receiving wireless communication unit (e.g., another wireless mesh node) the ability to easily determine whether (or not) an individual sounding transmission within the sounding burst has been received. Furthermore, the additional information within each transmitted WiFi™ message 470, 471, 472 of a sounding burst has been adapted to inform the receiving wireless communication unit (e.g., another wireless mesh node) with the ability to determine what version of 802.11 is being used by the transmitter (e.g., 802.11n, 802.11ac or 80211.ax). Furthermore, the additional information within each transmitted WiFi™ message 470, 471, 472 of a sounding burst has been adapted to inform the receiving wireless communication unit (e.g., another wireless mesh node) with the ability to determine the exact MCS at which each of the sounding transmissions in the sounding burst is using. Furthermore, the additional information within each transmitted WiFi™ message 470, 471, 472 of a sounding burst has been adapted to inform the receiving wireless communication unit (e.g., another wireless mesh node) with the ability to simplify the task of finding the appropriate rate value to use in the MCS tables.

In this manner, the receiving wireless communication unit is not dependent on 802.11 options, such as guard interval and the transmission bit rate, B, as shown in Tables 1 to 3, which show the case for 802.11n, 802.11ac and 802.11ax. Tables 1 to 3 contain all possible MCS, together with the associated bit rate, notably containing all the possible spatial streams, up to '4' in the case of 802.11n and up to '8' in the case of 802.11ac. However, typical 802.11 implementations have fewer than this, typically only '2'. In contrast, as illustrated in Table 4 an improved updated MCS rate table for 802.11n with relative ETT cost metric values can be generated and distributed. Similarly, as illustrated in Table 5 an improved updated MCS rate table for 802.11ac with relative ETT cost metric values can be generated and distributed. Additionally, as illustrated in Table 6 an improved updated MCS rate table for 802.11ax with relative ETT cost metric values can be generated and distributed. However, it is envisaged in other examples that other 802.11 versions are also possible.

Figure 5:
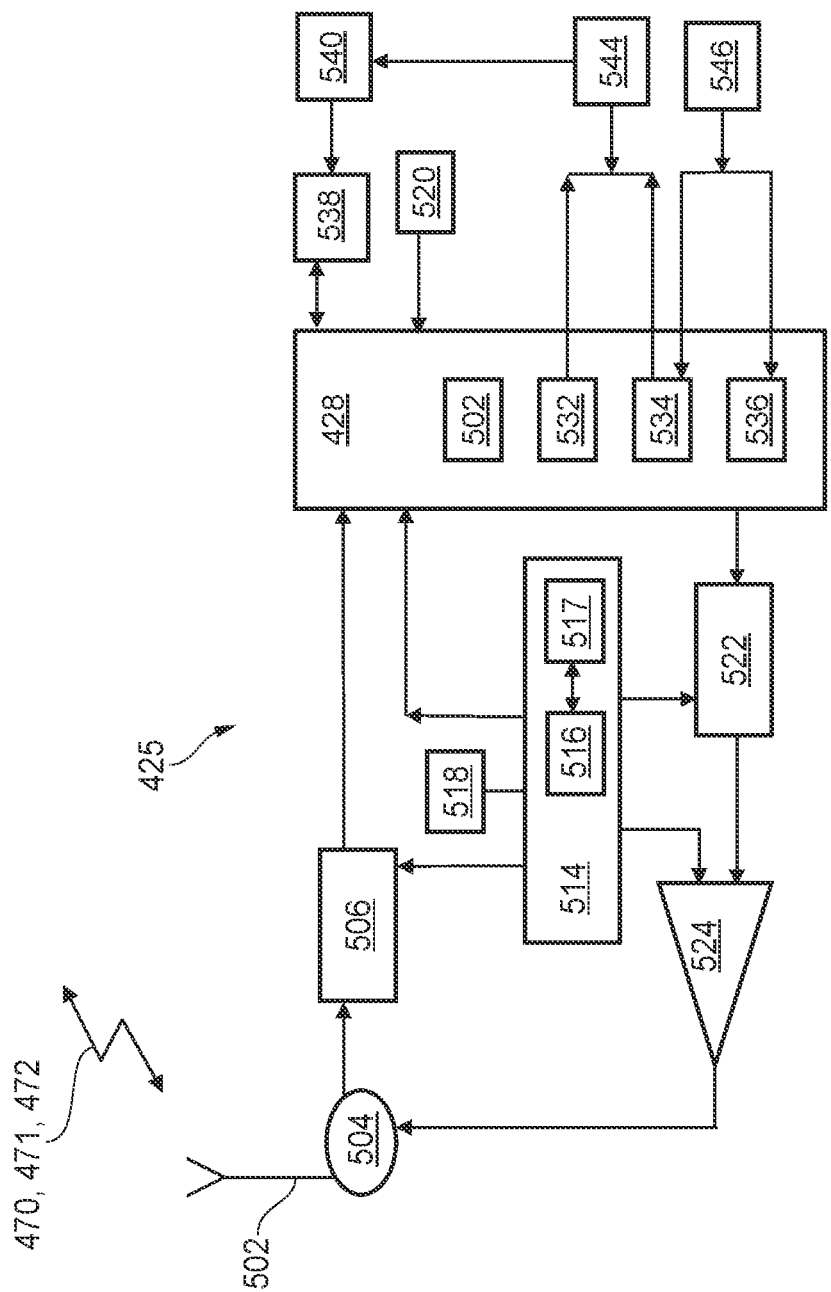
FIG. 5 illustrates a block diagram of a wireless communication unit, adapted in accordance with some example embodiments of the invention.

Referring now to FIG. 5, a block diagram of a wireless communication unit, adapted in accordance with some example embodiments of the invention, is shown. In practice, purely for the purposes of explaining embodiments of the invention, the wireless communication unit is described in terms of a wireless mesh node 425. The wireless communication unit contains one or more antenna(e) 502 for receiving or transmitting WiFi™ signals 470, 471, 472 coupled to an antenna switch or duplexer 504 that provides isolation between receive and transmit chains within the wireless mesh node 425. One or more receiver chains, as known in the art, include receiver front-end circuitry 506 (effectively providing reception, filtering and intermediate or base-band frequency conversion). The receiver front-end circuitry 506 is coupled to a signal processor 428 (generally realized by a digital signal processor (DSP)). A skilled artisan will appreciate that the level of integration of receiver circuits or components may be, in some instances, implementation-dependent. The controller 514 maintains overall operational control of the wireless communication unit (such as wireless mesh node 425). The controller 514 is also coupled to the receiver front-end circuitry 506 and the signal processor 428. In some examples, the controller 514 is also coupled to a buffer module 517 and a memory device 516 that selectively stores operating regimes, such as decoding/encoding functions, synchronization patterns, code sequences, and the like. A timer 518 is operably coupled to the controller 514 to control the timing of operations (e.g., transmission or reception of time-dependent signals) within the wireless communication unit 425.

As regards the transmit chain, this essentially includes an input module 520, coupled in series through transmitter/modulation circuitry 522 and a power amplifier 524 to the antenna 502, antenna array, or plurality of antennas. The transmitter/modulation circuitry 522 and the power amplifier 524 are operationally responsive to the controller 514.

In accordance with examples of the invention, signal processor 428 may process and formulate data for transmission to transmitter/modulation circuitry 522. The signal processor 428 comprises a sounding burst generation processor 502 (or circuit) that is coupled to the transmitter chain and arranged to generate a sounding burst comprising a plurality of sounding transmissions to be transmitted to the at least one neighboring wireless communication unit. In accordance with examples of the invention, the sounding burst generation processor 502 is arranged to add additional parameters into the sounding burst that include:
- an intra-burst sequence number for each MCS transmitted within each multicast sounding transmission;
- an indication of a number of sounding transmissions in the sounding burst; and
- an index value that references a set of values that are specific to the wireless configuration that the wireless remote communications unit employs and used together with the intra-burst sequence number that identifies a specific sounding transmission within the sounding burst to determine a relative bit rate value associated with each multicast sounding transmission within the sounding burst In this manner, the information provided by the additional parameters within each transmitted WiFi™ message 470, 471, 472 of a sounding burst provides the receiving wireless communication unit (e.g., another wireless mesh node) the ability to easily determine whether (or not) an individual sounding transmission within the sounding burst has been received. Furthermore, the additional information within each transmitted WiFi™ message 470, 471, 472 of a sounding burst has been adapted to inform the receiving wireless communication unit (e.g., another wireless mesh node) with the ability to determine what version of 802.11 is being used by the transmitter (e.g., 802.11n, 802.11ac or 80211.ax). Furthermore, the additional information within each transmitted message 470, 471, 472 of a sounding burst has been adapted to inform the receiving wireless communication unit (e.g., another wireless mesh node) with the ability to determine the exact MCS at which each of the sounding transmissions in the sounding burst is using. Furthermore, the additional information within each transmitted WiFi™ message 470, 471, 472 of a sounding burst has been adapted to inform the receiving wireless communication unit (e.g., another wireless mesh node) with the ability to simplify the task of finding the appropriate rate value to use in the MCS tables. In this manner, the receiving wireless communication unit is not dependent on 802.11 options, such as guard interval and the transmission bit rate, B.

Separate functionality inside of the signal processor 428 is also employed to provide beacon functionality. The beacon receive (RX) circuit 534 performs the function of processing the received beacons from multiple peer nodes within the mesh (note that there are multiple processing instances for each of the peer nodes that can be heard by this wireless mesh node 425). The beacon receive (RX) circuit 534 obtains preconfigured parameters from a parameter store 546. It passes on the results of the RX processing to a cost metric calculator 544.

Also as part of the signal processor 428 the beacon transmit (TX) circuit 536 is used to construct the beacon bursts, which are then transmitted using the transmit chain. The beacon transmit (TX) circuit 536 also obtains preconfigured parameters (such as beacon burst periodicity) from the pre-configured parameter store 546.

In examples of the invention, another circuit or processing function within the signal processor 428 is the "I hear you" (IHU) processing circuit 532. The IHU processing circuit 532 deals with the processing of IHU messages back from peer nodes, which inform the current node of their measurement of beacon transmitted from this current node. The result of this processing is also passed on to the cost metric calculator 544.

The cost metric calculator 544 takes the costs reported from the beacon RX circuit 534 (representing an RX cost) and the "I hear you" (IHU) processing circuit 532 (representing a TX cost) and processes this to form a single ETT cost metric for each of the neighbors of the current mesh node. The ETT cost metric is passed to the IP tables/routing circuit 540.

The IP tables/routing circuit 540, using a conventional routing protocol such as RIP, OSPF or babel, employs the ETT cost metric to find the best route through the mesh. This information is configured with IP route tables, which is passed on the IP stack circuit 538. The IP stack circuit 538 is a conventional IP stack, which is used to send data over the mesh routing is controlled by the IP tables/routing circuit 540.

In order to achieve these benefits, a processor in the transmitting communication unit includes the following parameters in each sounding transmission within the sounding burst by the respective transmitting wireless communication unit, e.g., wireless mesh node 425. First, an intra-burst sequence number is added (in addition to the conventional sequence number). In examples of the invention, the respective transmitting wireless communication unit increments the intra-burst sequence number for each transmission within the sounding burst.

Secondly, information on a number of sounding transmissions used in the sounding burst is added to the sounding transmission. In some examples, a further parameter of an indication of how many individual sounding transmissions are to be used in the sounding burst may be included. In some examples, this is contained in each individual sounding transmission in the sounding burst and is the same value within each of these sounding transmissions. In some examples, an enhancement to this functionality may be implemented whereby a non-consecutive MCS is deployed in the burst, as later described.

Thirdly, an additional parameter of a MCS rate table index may be included in the sounding transmission within the sounding burst by the respective transmitting wireless communication unit, e.g., wireless mesh node 425. In some examples, this parameter may be a pointer to a previously defined table which is a simplified version of the 802.11 rate tables (see tables 1 to 3 for the original tables). Note that typically there is a separate table for each version of 802.11 (i.e., one for 802.11n, another for 802.11ac, etc.). In this manner, the node/receiving wireless communication unit can then use a simple lookup with the appropriate table to help calculate the ETT metric The signal processor 428 in the transmit chain may be implemented as distinct from the signal processor in the receive chain. Alternatively, a single processor may be used to implement a processing of both transmit and receive signals, as shown in FIG. 5. Clearly, the various components within the wireless communication unit 425 can be realized in discrete or integrated component form, with an ultimate structure therefore being an application-specific or design selection.

Figure 6:
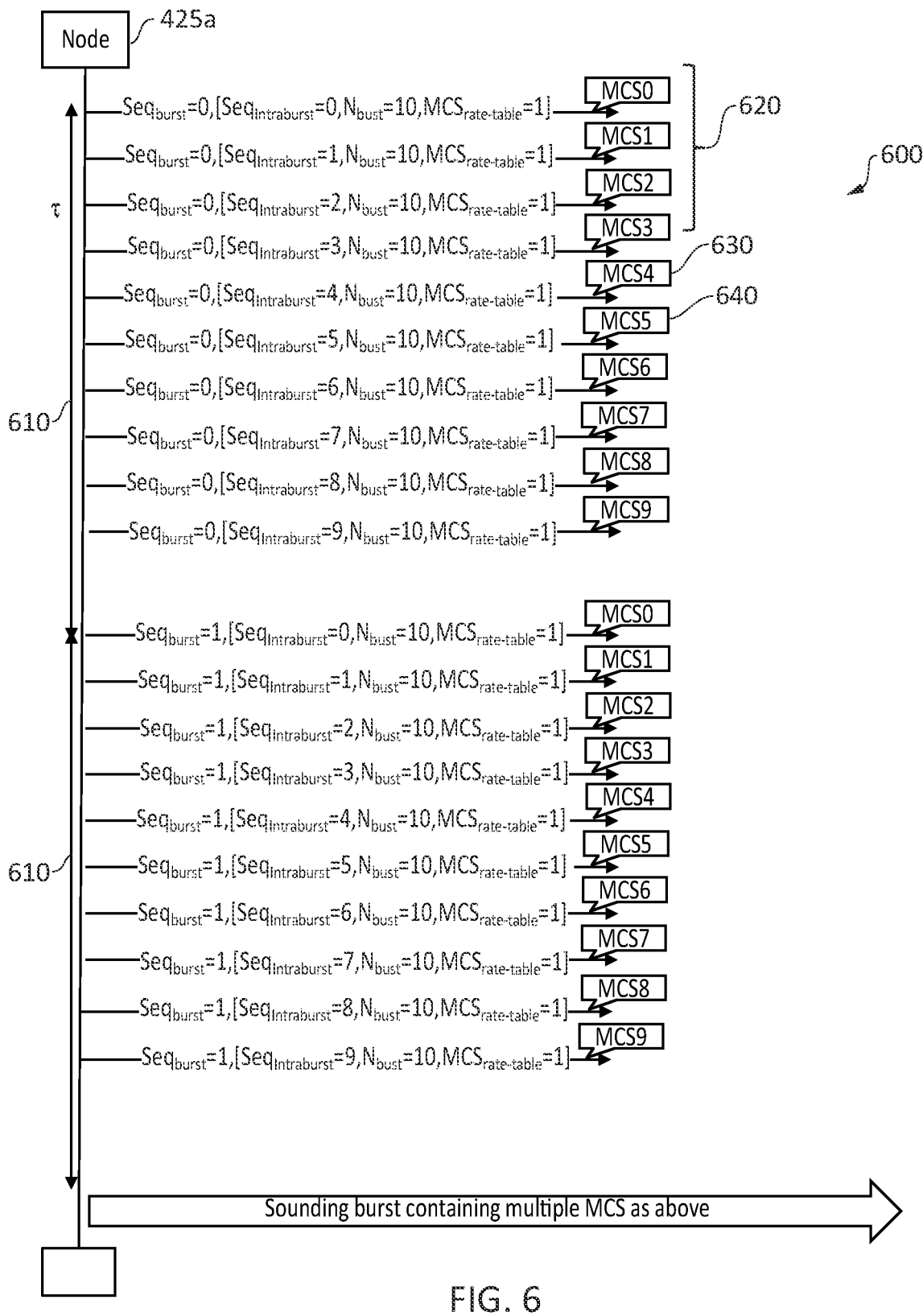
FIG. 6 illustrates a generated sounding burst comprising a plurality of sounding transmissions to be transmitted to at least one neighboring wireless communication unit, where the generated sounding burst is compliant with an 802.11n (with 256 QAM support at 5 GHz) single spatial stream and comprises a plurality of additional parameters, adapted in accordance with some example embodiments of the invention.
Figure 7:
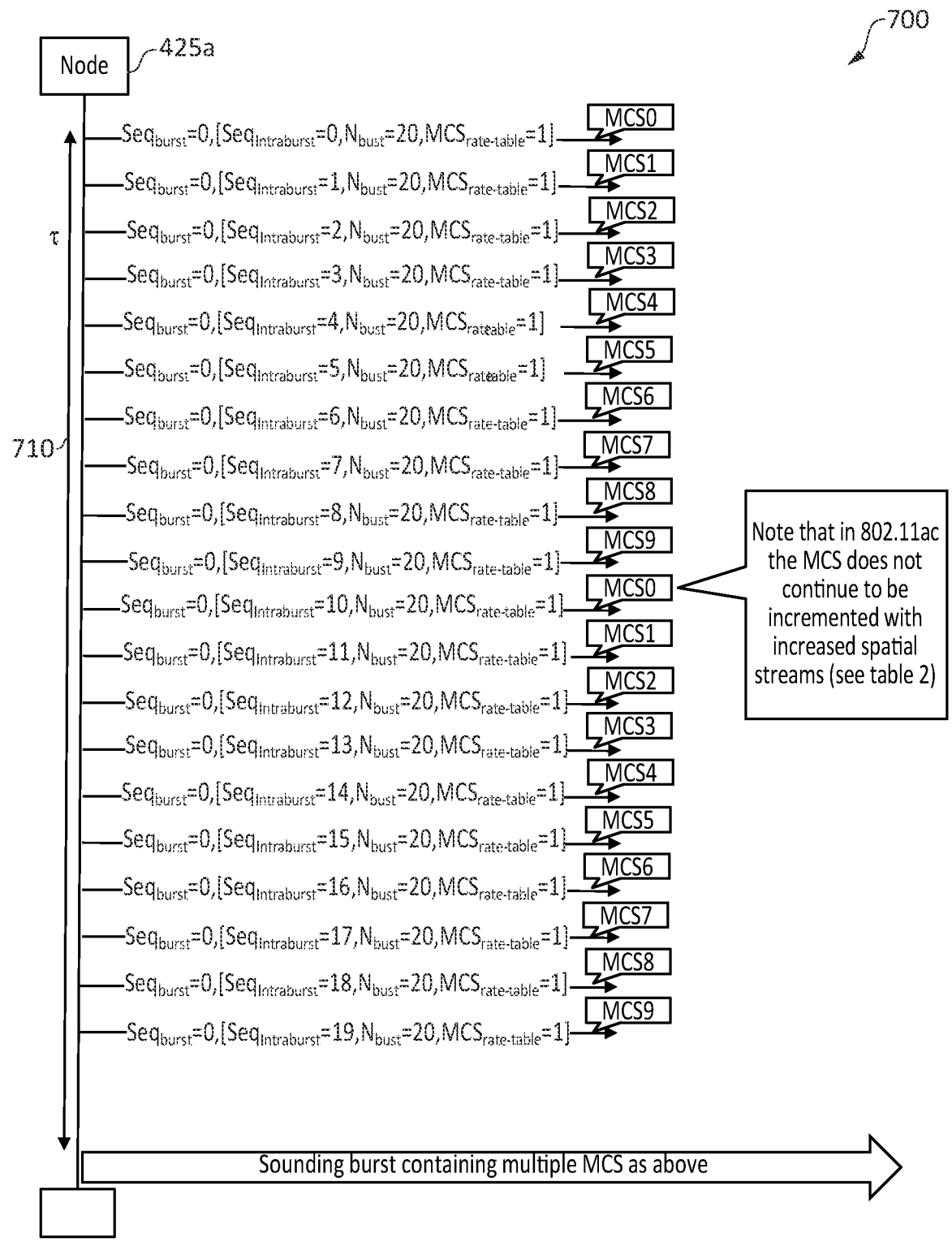
FIG. 7 illustrates a generated sounding burst comprising a plurality of sounding transmissions to be transmitted to at least one neighboring wireless communication unit, where the generated sounding burst is compliant with an 802.11ac (with 256 QAM support at 5 GHz) with two spatial streams and comprises a plurality of additional parameters, adapted in accordance with some example embodiments of the invention.
Figure 8:
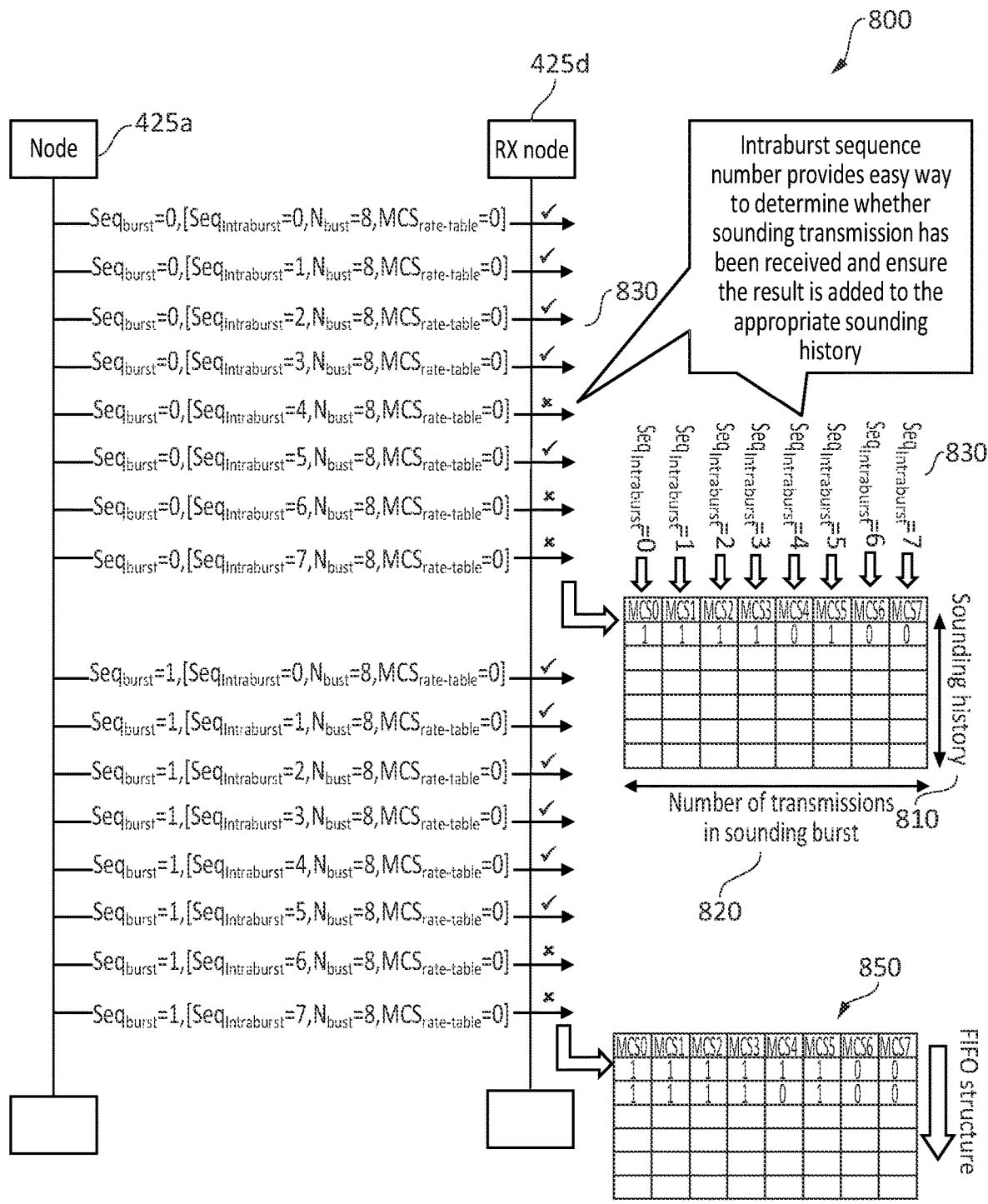
FIG. 8 illustrates a generated sounding burst comprising a plurality of sounding transmissions to be transmitted to at least one neighboring wireless communication unit, where the generated sounding burst is compliant with an 802.11ax and shows how sounding history may be created that provides new functionality, in accordance with some example embodiments of the invention.

Examples of the generated sounding burst comprising a plurality of sounding multicast transmissions to be transmitted to any receiving (neighboring) wireless communication unit, wherein the sounding burst comprises a plurality of additional parameters, is shown in FIGS. 6, 7 and 8. FIG. 6 illustrates a generated sounding burst comprising a plurality of sounding transmissions to be transmitted to at least one neighboring wireless communication unit, where the generated sounding burst is configured for, say, a scenario employing an 802.11n (with 256 QAM support at 5 GHz) single spatial stream 600 and comprises a plurality of additional parameters defined in the higher layer message, adapted in accordance with some example embodiments of the invention. FIG. 7 illustrates a generated sounding burst comprising a plurality of sounding transmissions to be transmitted to at least one neighboring wireless communication unit, where the generated sounding burst is compliant with an 802.11ac (with 256 QAM support at 5 GHz) with two spatial streams 700 and comprises a plurality of additional parameters, adapted in accordance with some example embodiments of the invention.

Figure 3:
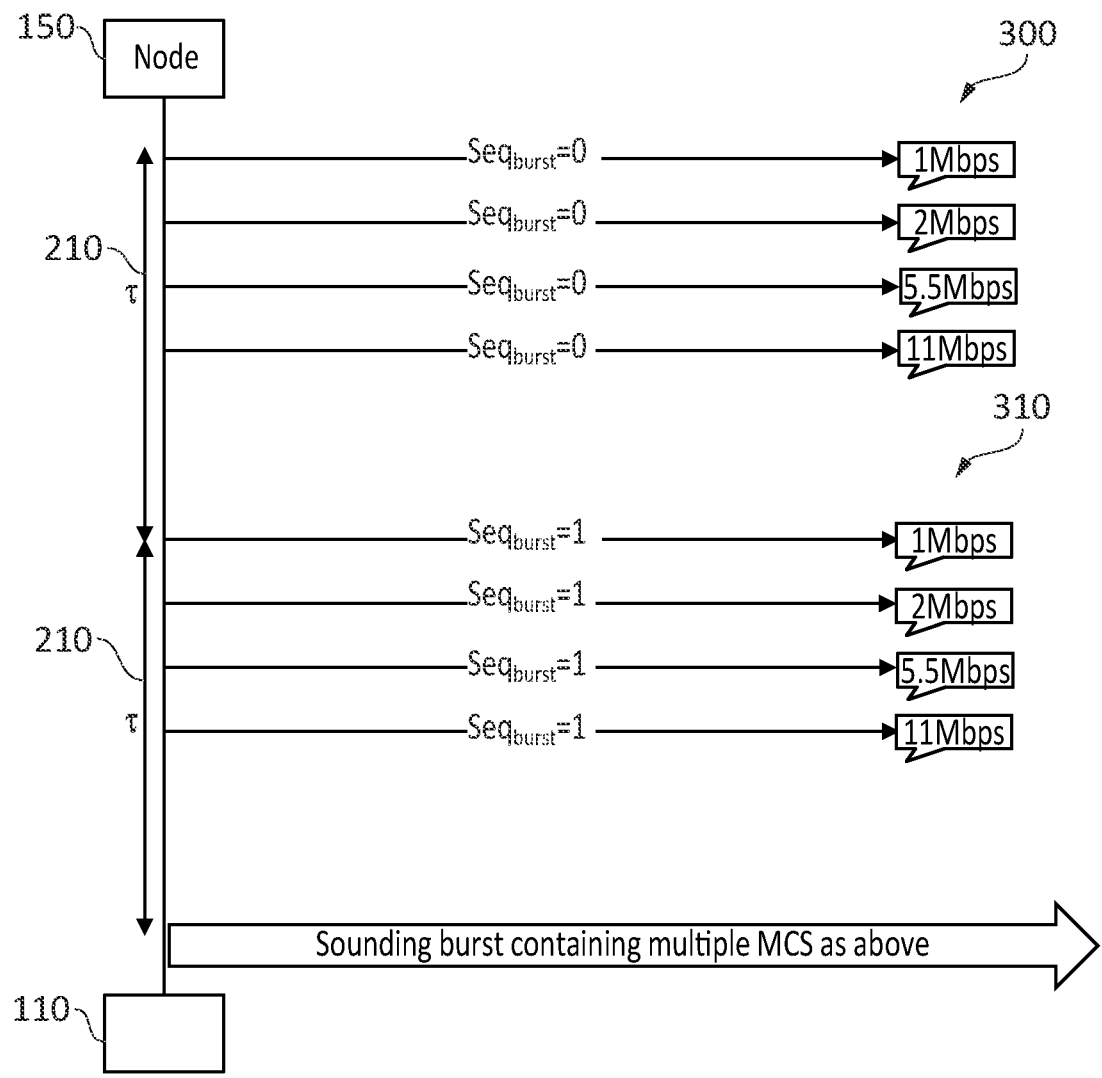
FIG. 3 illustrates a known sounding mechanism for multi rate sounding in 802.11b that sends a sequence of beacon transmissions at multiple different bit rates.

As can be seen the generated sounding bursts of FIG. 6 and FIG. 7 contain a legacy burst sequence number that is similar to that shown in FIG. 3, which includes a "hello" interval that matches the interval of the transmissions (shown again as τ 610, 710 in FIG. 6 and FIG. 7).

In an example embodiment that utilizes babel routing, this new information may be contained in a new sub Type Length Value, TLV, encoding sounding transmission(see for example https://en.wikipedia.org/wiki/Type%E2%80%93length%E2%80%93value#:~:text=Within%20communication%20protocols%2C%20TLV%20(type,and%20finally%20the%20value%20itself) containing at least three new parameters, as described above. In some examples, the new sub Type Length Value, TLV, encoding sounding transmission may include the legacy burst sequence number. In some further additional examples, the new sub Type Length Value, TLV, encoding sounding transmission may include a non-consecutive MCS where a bit map indicating which of the MCS is used may be employed, which would also result in an additional parameter. However, it is envisaged that other mechanisms to encode this information can also be used.

Intra-Burst Sequence Number

The time between transmissions in a sounding burst is necessarily short and therefore timer-based mechanisms to determine whether a transmission within a sounding burst has not been received is known to be difficult. Therefore, in accordance with examples of the invention, an intra-burst sequence number may be added and used to more easily determine whether a receiving communication unit has missed previous transmissions within a burst. For example, if the receiver detects that the received intra-burst sequence number is not the same as the expected received sequence number, one plus the previously received intra-burst sequence number, a determination is made at the receiving communication unit that the receiving communication unit has missed at least one previous transmission within a burst.

Thus, as shown in the example in FIG. 6, the receiving node shown (note that sounding transmissions are multicast transmissions so there could be multiple nodes receiving this burst concurrently) correctly receives transmission '1 to 4' 620 in the sounding burst ($Seq_{intra\_burst}$=0,1,2,3), fails to receive sounding transmission 5 ($Seq_{intra\_burst}$=4) 630 and then correctly receives transmission 6 ($Seq_{intra\_burst}$=5) 640. After reception of $Seq_{intra\_burst}$=3 the next expected intra-burst sequence number is MCS 4 630, thus since a burst with $Seq_{intra\_burst}$=5 (i.e., MCS 5 640) is received it is immediately determined that there has been a missed sounding transmission.

Note that later transmissions in the burst that are transmitted at high MCS may all not be received. In this case the legacy "hello" interval and burst sequence number can be used to determine that these transmissions have not been received.

FIG. 8 illustrates a generated sounding burst 800 comprising a plurality of sounding transmissions to be transmitted to at least one neighboring wireless communication unit, where the generated sounding burst is compliant with an 802.11ax and shows how sounding history may be created that provides new functionality, in accordance with some example embodiments of the invention. In the example, the generated sounding burst 800 shows how a sounding history can be directly constructed using the parameters in each of the 'hello' transmissions In order to make an accurate measurement of the sounding transmission loss rate ('p' from equation 2) it is necessary to accumulate the result of the reception/non-reception measurements described above over a number of sounding bursts. This creates a sounding history 810 which is kept over N previous sounding bursts 820. It is necessary to create separate histories for each of the MCS used in the sounding bursts, with the eighth sequence example shown in FIG. 8, this creates an array of records indicating whether (or not) the sounding transmission was received. The intra-burst sequence number 830 provides a simple and robust mechanism by which to add the result to the appropriate history (i.e., the appropriate column in the array shown in FIG. 9).

Note that, in some examples, the array of records indicating whether (or not) the sounding transmission was received may be updated in a first-in first-out (FIFO) fashion 850 so that when new measurements are obtained for a sounding burst these are added to the top row and the data at the bottom row may be discarded. In this manner, this forms a sounding history, which as mentioned above is kept over N bursts. In the example of FIG. 8, this is shown as six bursts (i.e., 6 rows in the array). However, it is envisaged that in practice longer histories of typically 64 bursts (rows) may be used.

MCS Rate Table Index (And Updated MCS Rate Tables)

As shown in equation 2 the bit rate, B, for the connection is required to calculate the ETT metric (i.e., the bit rate of the MCS on which the error rate p was made). Tables 1 to 3 shows MCS/rate tables for 802.11n, 802.11ac and 802.11ax. As can be seen, and as mentioned in previous section detailing disadvantages in the prior art, there are a number of different 802.11 versions (the 3 quoted here are examples and are a subset of the overall set of possible cases) and inside the 802.11 version there are a large number of options which affect the bit rate, hence the large size of the tables. If the ETT parameter was calculated directly as described in equation 2 then it is necessary to know all of these parameters plus the size of the sounding transmission. This is clearly a potentially complex calculation particularly informing neighbor nodes about sounding transmission size as this may change over the course of the connection.

Figure 2:
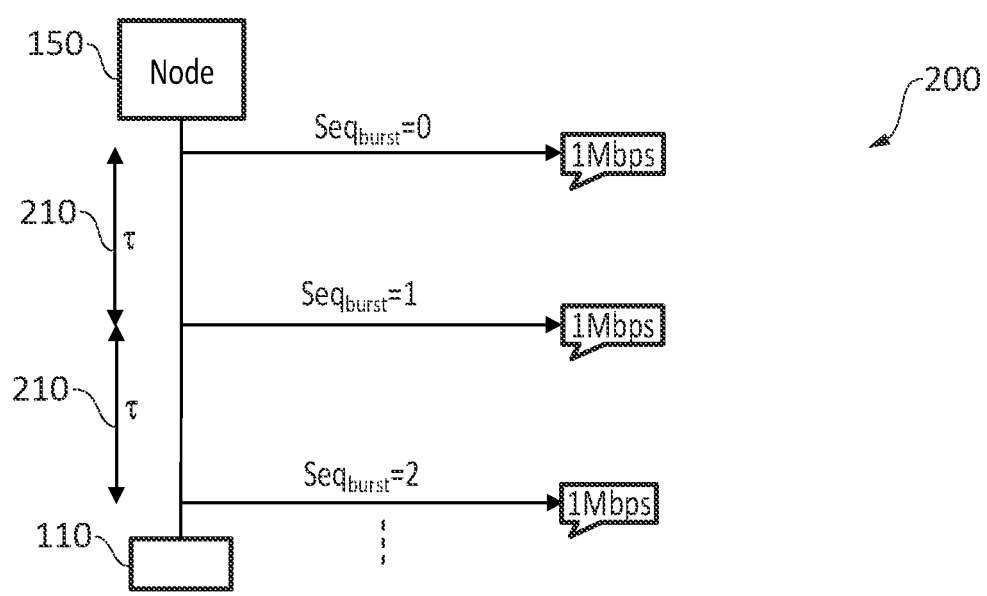
FIG. 2. illustrates a known basic sounding functionality associated with an ETX metric determination.

However, the key issue regarding cost calculation is the relative value both within a single link between different MCS and between different links across the network as was shown in the simple examples 100, 200 shown in FIGS. 1 and 2. This leads to the following enhancements:

Rather than use absolute values for the MCS bit rate determination, a relative number can be obtained based on the peak bit rate obtainable, for example the processor calculates a cost metric, such as an estimate transmission time (ETT) cost metric, for a respective received sounding burst for each of the received sounding transmissions received via the plurality of communication links using a relative value between a peak bit rate and an individual bit rate contained in a MCS rate table.

It is not necessary to use an absolute value for the packet size as this will be the same for all links investigated. It will almost always be 1500 bytes for the typical case of sending TCP data to a neighboring node (maximum packet size) and because this is unchanging it can be removed from the calculation.

Looking at the relative bit rate issue in more detail and taking the example of 802.11n with 20 MHz bandwidth and 0.8 mS guard interval (GI), the lowest bit rate, associated with MCS1/single spatial stream, is 6.5 Mbps and the highest bit rate, associated with MCS31/four spatial streams, is 260 Mbps (see table 1). The ratio of these is thus:

260 Mbps/6.5 Mbps=40

Thus, the relative cost of MCS1 over MCS31 is 40 and it would be possible to assign a cost metric of 1 to MCS31 and 40 to MCS1. This can be repeated for all possible MCS in 802.11n (20 MHz bandwidth/0.8 mS) such that for example MCS2 would be assigned an 'MCS rate cost' of 260/13=20 etc.

Additionally, it is notable that for all the other possible combinations of bandwidth and guard interval (i.e., 20 MHZ BW/0.4 mS GI, 40 MHZ BW/0.8 mS GI and 40 MHZ BW/0.4 mS) the same MCS rate costs apply. For example, for the case of 40 MHZ BW/0.4 mS GI MCS1 is associated with a rate of 15 Mbps and MCS31 is associated with a rate of 600 Mbps thus the ratio between these is again 40

Thus, it is observed that for the case of 802.11n table 1 can be simplified to a simple lookup of MCS to MCS rate cost. This simplified table is shown in table 4. Similarly, the MCS rate cost tables for 802.11ac and 802.11ax are shown in tables 5 and 6 respectively.

The MCS rate cost can then be used to directly calculate overall cost without the need to know the transmission bandwidth (BW) or GI.

These MCS rate cost tables are assigned an index value, MCS rate table index. One example would be 802.11n MCS rate table index=0, 802.11ac MCS rate table index=1, 802.11ax MCS rate table index=2. These index values are contained in each transmission in the sounding burst (see examples in FIG. 5, FIG. 6 and FIG. 7). In this way a receiving wireless communication unit can immediately know, at the routing protocol layer, what MCS the sounding transmission was sent.

The values in the MCS rate cost tables themselves are fixed and can thus be stored permanently on the device prior to operation of the mesh updates to the table could then be provided from a central server when required.

Number of Sounding Transmissions in Sounding Burst ($N_{burst}$)

It is important to let the receiving wireless communication unit (or receiving neighboring wireless communication unit (or receiving node) in the wireless mesh network)) know the number of transmissions in the sounding burst in order that the array for the sounding history can be correctly sized (see the example in FIG. 8). Notably, in this manner, the number of columns in the array can be set correctly. Additionally, the receiving wireless communication unit can more easily determine whether (or not) bursts have been received, since it knows how many sounding bursts were actually transmitted. This is particularly the case of the transmissions using high MCS at the end of the sounding burst. Thereafter, the exact MCS of the transmissions can be determined when referenced with the MCS rate cost table (for example determined from the MCS rate table index).

Enhancement to Simple $N_{burst}$ Parameter

In some circumstances it may be desirable for a sounding burst to be employed that contains non-consecutive MCS. For example, in an 802.11n scenario it may be desirable to use a sounding burst that contains MCS0, MCS1, MCS3, MCS5 and MCS7 (the reason to employ such a burst would be to obtain estimates of delivery rate at various rates, but using shorter sounding bursts). In order to support such an exemplary feature, instead of a simple $N_{burst}$ parameter, it is envisaged that a Burst bitmap together with a bit map size could be employed. In the example above the burst bitmap would be: 1 1 0 1 0 1 0 1 and a bit map size of '8'. Using this information, it would be possible for any combination of MCS to be used within a sounding burst according to examples of the invention.

Overall ETT Metric Determination

The conventional calculation of the ETT metric is shown in equation 2. This can now be updated to the simpler equation shown below:

$$\text{cost\_ETT}_{MCS} = \frac{1}{PDR_{MCS}} * MCS\_\text{rate\_cost}_{MCS} \quad [4]$$

Where $PDR_{MCS}$ is the packet delivery rate per MCS. Packet delivery rate is 1−p from equation 2 and it is determined on a per MCS basis, i.e., determined from each column of the array as determined by observing whether transmissions within a sounding burst have been received or not, i.e., 830 in FIG. 8; and MCS_rate_cost is a simple lookup based on the MCS rate table pointed to by the MCS rate table index.

The calculations described above are performed for all the MCS in the sounding burst (as described above this number is defined by the parameter 'number of sounding transmissions in sounding bursts). The overall cost metric is then determined as the minimum cost over all MCS as described in the equation below:

$$\text{cost\_ETT} = \min_{MCS} (\text{cost\_ETT}_{MCS}) \quad [5]$$

Referring now to FIG. 9, an example of an overall ETT cost calculation from sounding history and using a MCS rate table index is shown, in accordance with some example embodiments of the invention. The example illustration 900 in FIG. 9 provides one example approach to calculating a ETT metric cost from the simplified example initially shown in FIG. 8. An improved MCS rate table 910 is shown, identified as index '0' with '8' transmission sounding bursts, with a sounding history 915 of the previous six measurements taken (illustrated on the vertical axis of the improved MCS rate table 910. Note that typically the sounding history would be a much higher figure, for example covering the sixty four previous measurements, where in this example a history of six sounding measurements is illustrated for simplicity purposes only. The improved MCS rate table 910 additionally includes an indication of each packet delivery rate per MCS 920. The improved MCS rate table 910 additionally includes each MCS_rate_cost 930, which may be a simple lookup based on the MCS rate table pointed to by the MCS rate table index already stored in a memory of each receiving wireless communication unit. The improved MCS rate table 910 additionally includes a calculated modified ETT cost for each MCS 940. Finally, in this example, the improved MCS rate table 910 additionally includes an overall revised ETT cost metric 950, which is the lowest determined value of the calculated modified ETT cost across each of the utilized MCSs, which in this example is a modified ETT cost metric value of '8'.

In further detail, following determination of the sounding history at 915 for each MCS 910, the following parameters are then calculated:

$PDR_{MCS}$

Since all of the sounding transmissions for MCS0, MCS1, MCS2, MCS3 are all received over the window period at 915 the associated packet delivery rate at 920 is 1, i.e., $PDR_{MCS0}=1$, $PDR_{MCS1}=1$ $PDR_{MCS2}=1$, $PDR_{MCS3}=1$. For MCS4: 5 out of 6 sounding transmissions are received over the window period therefore $PDR_{MCS4}=5/6=0.8333$. Whereas, for MCS5: 3 out of 6 sounding transmissions are received over the window period therefore $PDR_{MCS5}=3/6=0.5$ Whereas f:or MCS6 and MCS7 no sounding transmissions where received over the window period therefore $PDR_{MCS5}=0$ and $PDR_{MCS5}=0$.

$MCS\_rate\_cost_{MCS}$

Here, $MCS\_rate\_cost_{MCS}$ at 930 may be obtained via simple lookup. The MCS rate table index in this example is '0'. Table 4 illustrates the corresponding table for this index value. Reading from this table, for the corresponding MCS in this example (MCS 0, 1, 2, 3, 4, 5, 6, 7), results in the following MCS_rate_costs:

$MCS\_rate\_cost_{MCS0}=40$, $MCS\_rate\_cost_{MCS1}=20$, $MCS\_rate\_cost_{MCS2}=13.333$, $MCS\_rate\_cost_{MCS3}=10$, $MCS\_rate\_cost_{MCS4}=6.6667$, $MCS\_rate\_cost_{MCS5}=5$, $MCS\_rate\_cost_{MCS6}=4.444$, $MCS\_rate\_cost_{MCS7}=4$.

$Cost\_ETT_{MCS}$

Using equation 4 results in the following values for $Cost\_ETT_{MCS}$ at 940:

$$Cost\_ETT_{MCS0}=1*40=40, Cost\_ETT_{MCS1}=1*20=20,$$
$$Cost\_ETT_{MCS2}=1*13.333=13.3333,$$

$$Cost\_ETT_{MCS3}=1*10=10, Cost\_ETT_{MCS4}=(1/0.8333)*6.6667=8, Cost\_ETT_{MCS5}=(1/0.5)*5=10, Cost\_ETT_{MCS6}=(1/0)*4.444=Inf,$$
$$Cost\_ETT_{MCS7}=(1/0)*4=Inf$$

Cost_ETT

Thus, the overall cost, cost_ETT at 950 is the lowest value of $Cost\_ETT_{MCS}$ over all cases of MCS. Thus Cost_ETT='8'.

It is envisaged that the aforementioned example of FIG. 9 can be adapted according to the examples of the concepts herein described, and the specific number and ranges of values are provided for simplicity of illustration purposes only. It is also envisaged that examples of the invention can be applied in a variety of wireless mesh networks, such as WiFi™ 802.11 networks, routing protocols, employing both distance vector and link state. Note that all routing protocols require a means to assess the cost associated with each link in an overall route, they then work to find the route which has the overall lowest cost. For example in FIG. 1 a routing protocol would use the metrics that are described in this patent to correctly choose the two hop path though node 4 140 and node 3 130 of FIG. 1.

Separate flowcharts are hereafter described, where some flowcharts are separated due to concurrent functionality adopted for different described processes, to notably accommodate separate beacon transmission and reception functionality.

Figure 10:
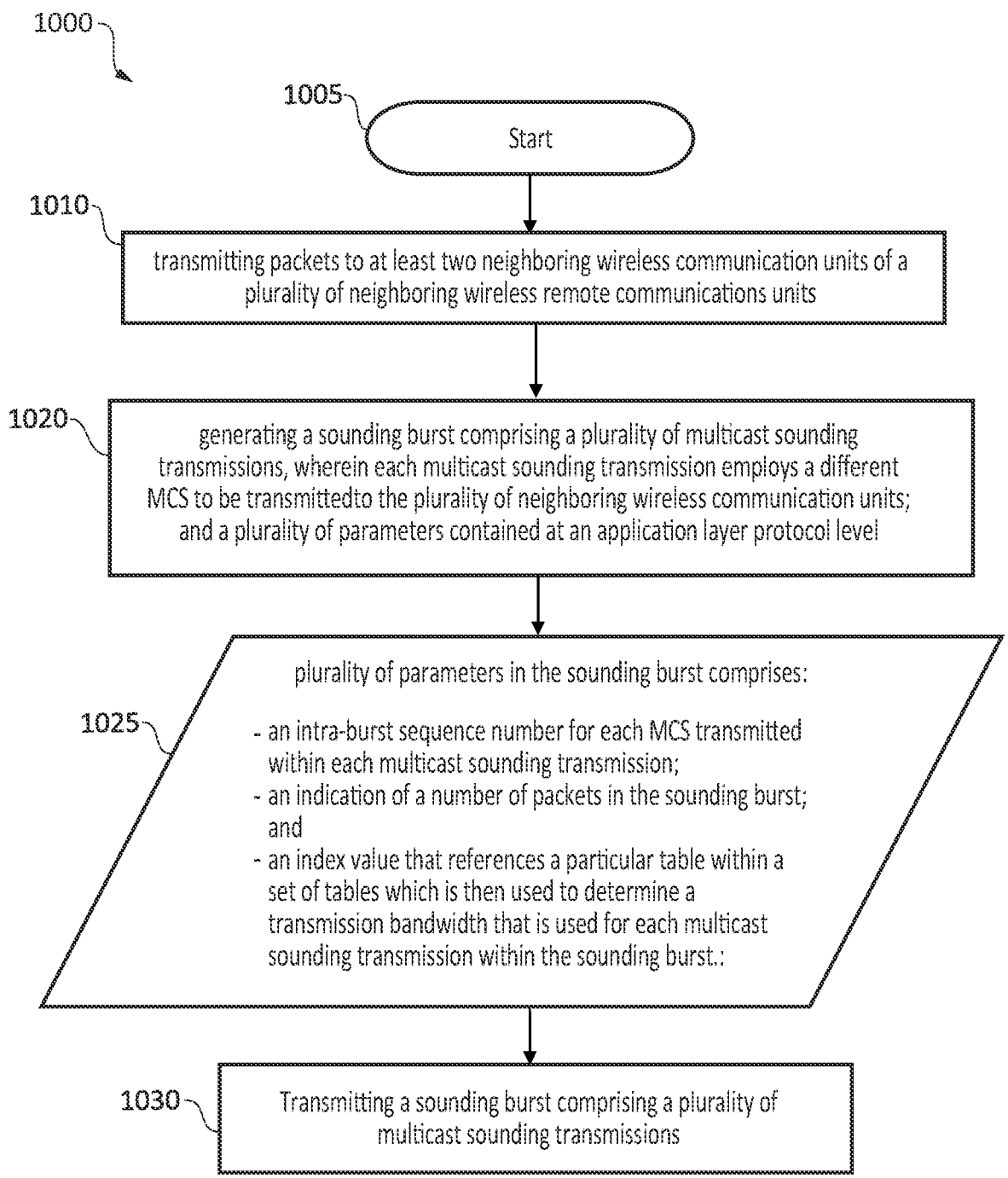
FIG. 10 illustrates an example flowchart for determining a plurality of link costs for communications to a receiving wireless communication unit in a wireless mesh network in a wireless communication unit configured to use a multiple modulation and coding scheme, MCS, in accordance with some example embodiments of the invention.

Referring now to FIG. 10, an example flowchart 1000 illustrates a method for determining a plurality of link costs for communications to a receiving wireless communication unit in a wireless mesh network in a wireless communication unit configured to use a multiple modulation and coding scheme, MCS, in accordance with some example embodiments of the invention. The method, performed at a transmitting wireless communication unit starts at 1005 and at 1010 includes transmitting sounding transmissions to at least two neighboring wireless communication units of a plurality of neighboring wireless communications units, wherein the wireless mesh network comprises the at least two neighboring wireless communication units forming a respective communication path between the wireless communication unit and the receiving wireless communication unit. At 1020, the flowchart includes generating a sounding burst comprising a plurality of multicast sounding transmissions, wherein each multicast sounding transmission employs a different MCS to be transmitted to the plurality of neighboring wireless communication units; and a plurality of parameters contained at an application layer protocol level. At 1025, it is shown that the sounding burst comprising a plurality of multicast sounding transmissions includes a plurality of parameters, including: an intra-burst sequence number for each MCS transmitted within each multicast sounding transmission; an indication of a number of sounding transmissions in the sounding burst; and an index value that references a set of values that are specific to the wireless configuration that the wireless remote communications unit employs and used together with the intra-burst sequence number that identifies a specific sounding transmission within the sounding burst to determine a relative bit rate value associated with each multicast sounding transmission within the sounding burst. At 1030, the sounding burst comprising a plurality of multicast sounding transmissions is broadcast/multicast into the wireless mesh network.

Figure 11:
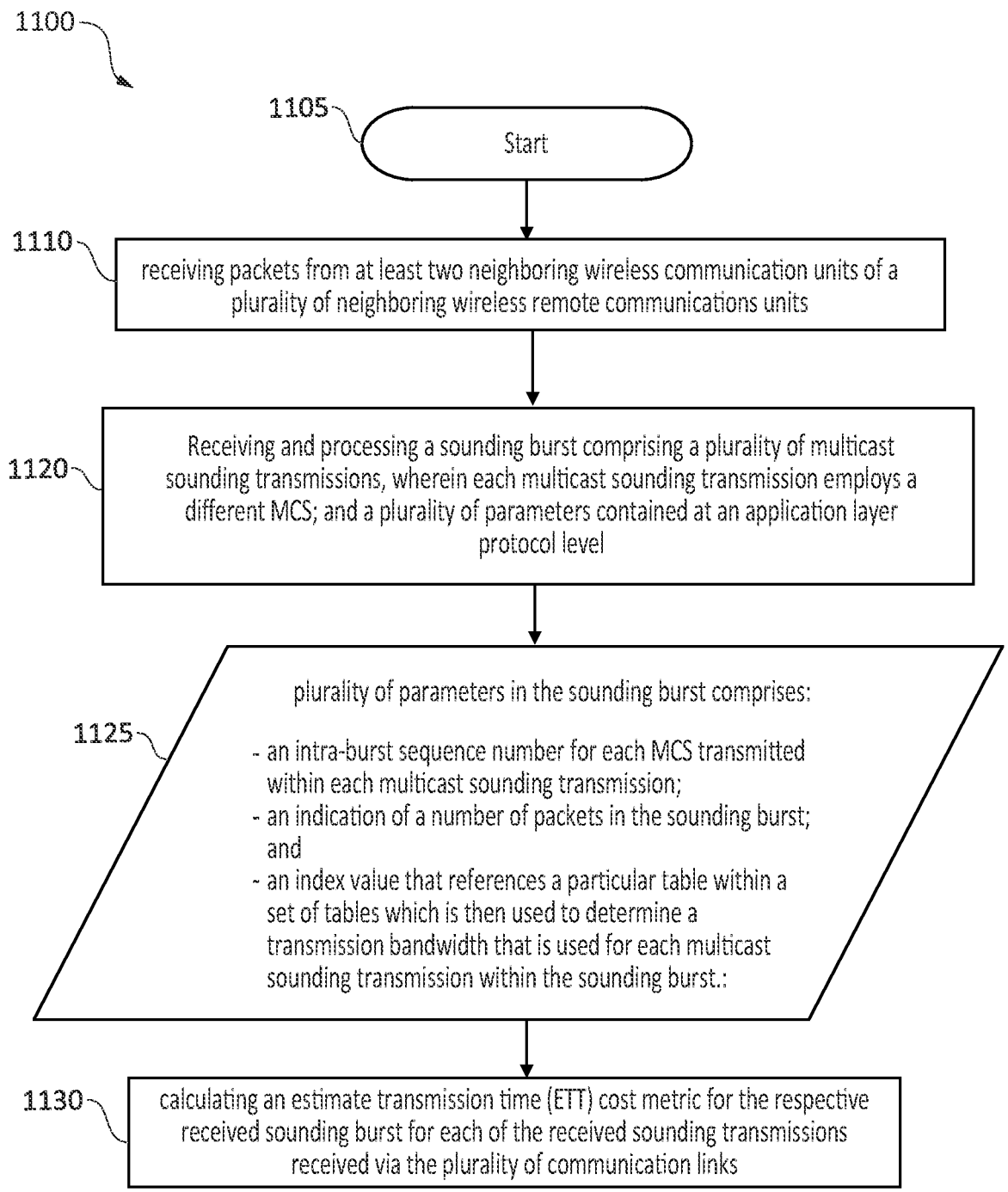
FIG. 11 illustrates an example flowchart for determining a plurality of link costs for communications received at a receiving wireless communication unit from a transmitting wireless communication unit in a wireless mesh network that is configured to use a multiple modulation and coding scheme, MCS, in accordance with some example embodiments of the invention.

Referring now to FIG. 11, an example flowchart 1100 illustrates an example method for determining a plurality of link costs for communications received at a receiving wireless communication unit from a transmitting wireless communication unit in a wireless mesh network that is configured to use a multiple modulation and coding scheme, MCS, in accordance with some example embodiments of the invention. a receiving wireless communication unit. The method, performed at a receiving wireless communication unit starts at 1105 and at 1110 includes receiving sounding transmissions from at least two neighboring wireless communication units of a plurality of neighboring wireless communications units, wherein the wireless mesh network comprises the at least two neighboring wireless communication units forming a respective communication path between the transmitting wireless communication unit and the receiving wireless communication unit. At 1120, the flowchart includes receiving and processing a sounding burst comprising a plurality of multicast sounding transmissions, wherein each multicast sounding transmission employs a different MCS from respective neighboring wireless communication units of the plurality of neighboring wireless communication units; and each multicast sounding transmission comprises a plurality of parameters contained at an application layer protocol level. At 1125, it is shown that the sounding burst comprising a plurality of multicast sounding transmissions includes a plurality of parameters, including: an intra-burst sequence number for each MCS transmitted within each multicast sounding transmission; an indication of a number of sounding transmissions in the sounding burst; and an index value that references a set of values that are specific to the wireless configuration that the wireless remote communications unit employs and used together with the intra-burst sequence number that identifies a specific sounding transmission within the sounding burst to determine a relative bit rate value associated with each multicast sounding transmission within the sounding burst. At 1130, the flowchart includes calculating an estimate transmission time (ETT) cost metric for the respective received sounding burst for each of the received sounding transmissions received via the plurality of communication links.

Figure 12:
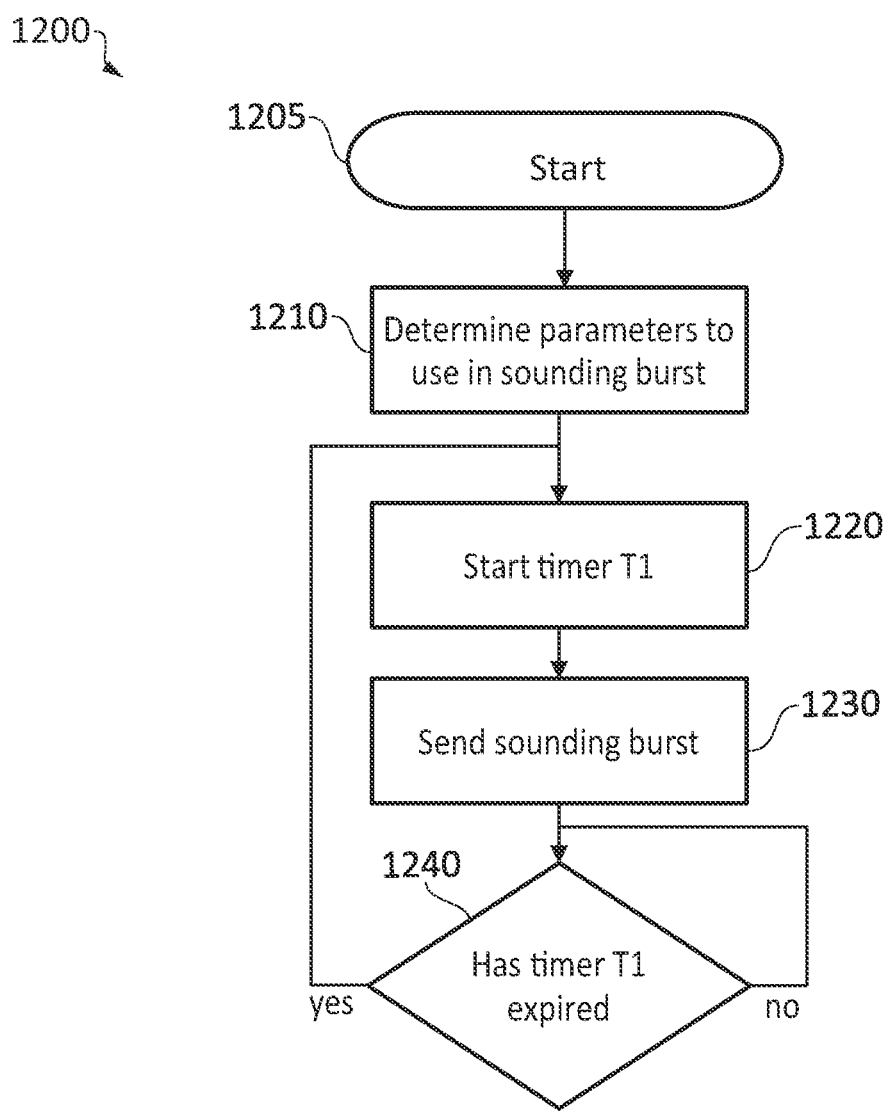
FIG. 12 illustrates an example flowchart for sounding burst transmission functionality, in accordance with some example embodiments of the invention.

Referring now to FIG. 12, an example flowchart 1200 illustrates a method for sounding burst (with beacon) transmission functionality, in accordance with some example embodiments of the invention. The flowchart starts at 1205. Initially, at 1210, the parameters that define the sounding burst are determined. In examples of the invention, this determining of parameters will factor in: an intra-burst sequence number for each MCS transmitted within each multicast sounding transmission (T1 in FIG. 12); a number of sounding transmissions in the sounding burst (Nburst) (also if the non-consecutive MCS option is chosen, see above, then additionally the specific MCS that are to be used and, say, an associated bitmap); and the MCS to be used. In some examples, the determined parameters may then be used directly to select the MCS rate table index. The rest of the flowchart 1200 represents a simple timer based mechanism where a first timer T1 starts at 1220 and a sounding burst is sent every time the timer T1 expires at 1230. Note that when the sounding burst is sent, the parameters selected above are used to construct the sounding burst and, in some examples this additional information may also be sent in the sub-TLV, which is part of the burst (details described above).

Figure 13:
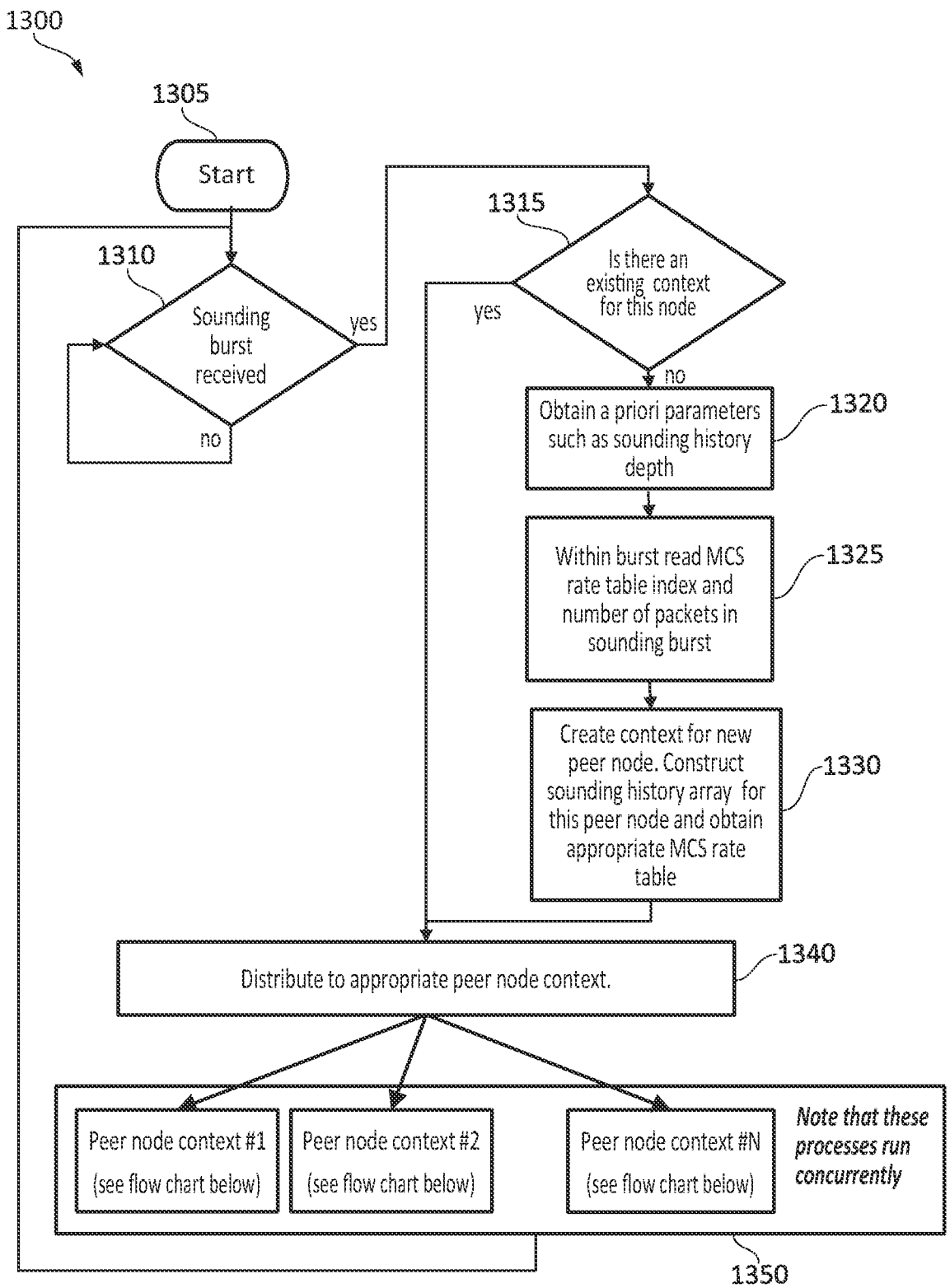
FIG. 13 illustrates an example flowchart for overall sounding burst reception functionality, in accordance with some example embodiments of the invention.

Referring now to FIG. 13 an example flowchart 1300 illustrates a method for overall sounding burst reception functionality, in accordance with some example embodiments of the invention. The flowchart starts at 1305. At 1310, the overall sounding burst reception functionality begins with a first decision box that continuously looks for a sounding burst (for example identified by checking whether (or not) it includes an appropriate destination multicast MAC address). If the sounding burst does contain appropriate destination multicast MAC address at 1310, then the flowchart moves to a second decision box at 1315 where, based on the MAC source address, a decision is made as to whether there currently exists a context for this particular peer node.

If a context for the source peer node exists at 1315, then processing is passed directly to the appropriate context at 1340. The functionality for the peer node context is subsequently explained in FIG. 14. If there is no current context for the source peer node at 1315, then a context needs to be created. In order to create a new peer node context, firstly the 'a priori' defined parameters that apply to all peers are obtained at 1320. Typically this is the sounding history depth (e.g., the number of past history samples that the link loss rate is calculated over (subsequently this parameter may be used to determine the number of rows in a sounding history array)).

After the 'a priori' non-peer specific parameters have been determined the peer node specific parameters are obtained by looking within the information contained in the sounding transmission at 1325, say, the new sub-TLV. For example, within the sub-TLV, the rate table index and the number of sounding transmissions in the sounding burst, Nburst, are obtained (note that if the non-consecutive MCS option is chosen then in addition to the Nburst parameter an additional MCS bitmap will need to be received). Thereafter, at 1330, the peer node context is created and distributed at 1340, 1350. Here, the sounding history array for the peer node may also be created, where the Nburst parameter is used to configure the number of columns and the sounding history depth used to configure the number of rows. Note that there are multiple instances of this functionality for all the peer nodes which have sounding bursts received by this node. Additionally the MCS rate table history may be used to look up the appropriate rate table that is used to calculate the ETT in the peer node context functionality in FIG. 14.

Figure 14:
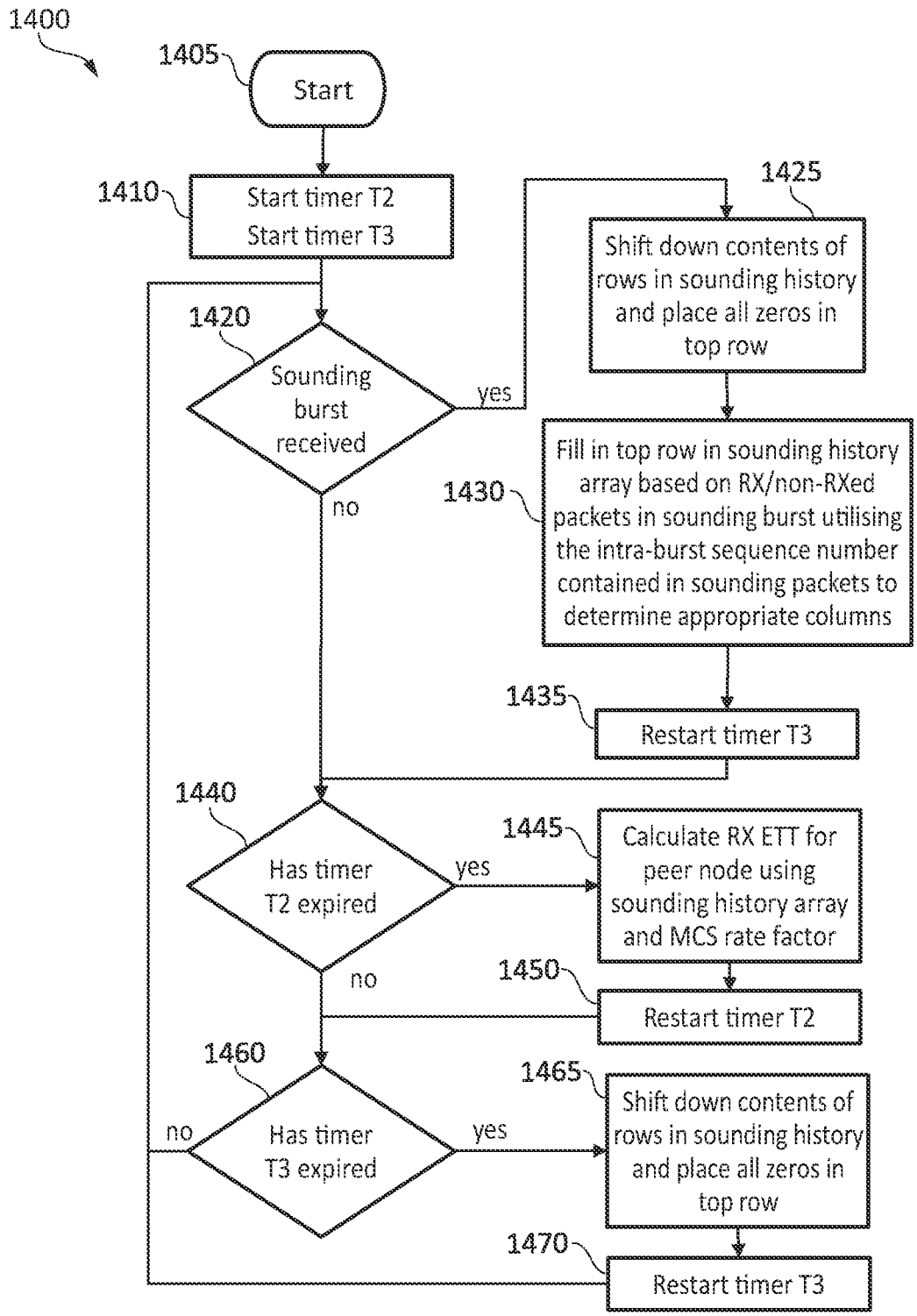
FIG. 14 illustrates an example flowchart showing peer node context sounding burst reception functionality, in accordance with some example embodiments of the invention.

Referring now to FIG. 14 an example flowchart illustrates a method showing peer node context sounding burst reception functionality, in accordance with some example embodiments of the invention. The flowchart starts at 1405. At 1410, the receiving node of the distributed peer node context starts a second timer T2 and a third timer T3. The second timer T2 controls the rate at which the receiver ETT metric is calculated; this would typically be equivalent to the sounding history depth. The third timer T3 may be used to ensure that when no sounding transmissions within the sounding burst are received the sounding history is updated with all zeros for that period (typically T3 is set to slightly longer than the transmit sounding burst periodicity, i.e. T1 in FIG. 11). Note that 1410 only needs to be run when the peer entity has first been created. Subsequently the main loop of the functionality (described below) continuously runs.

In the main loop of the peer node functionality there are three decision boxes. A first decision box, at 1420, determines whether (or not) a sounding burst is received. If, at 1420, a sounding burst is received then the sounding history is shifted down one row, with the contents of the bottom row discarded and all zeros placed in the top row at 1425. Thus, effectively, a FIFO structure is maintained. Furthermore, at 1430 and based on the individually received/not received sounding transmissions within the sounding burst, the receiving node fills in the top row of the sounding history utilizing the intra-burst sequence number to identify the appropriate columns. For instance, if individual sounding transmissions with intra-burst sequence numbers 1, 2, 3 and 5 are received then add a '1' to in columns 1, 2, 3 and 5 of the top row in the sounding history array. At 1435, the timer T3 is re-started (i.e. the timer used to determine that nothing in the sounding burst is received).

In a second decision box at 1440, a determination is made as to whether (or not) timer T2 has expired. If timer T2 has expired then at 1445, the peer node calculates an ETT using the current sounding history (say, from the sounding history array) together with the appropriate MCS rate table information (using the mechanism outlined in FIG. 9). Thereafter, at 1450, timer T2 is reset and restarted.

In a third decision box at 1460, a determination is made as to whether (or not) timer T3 has expired. If timer T3 has expired, in that no sounding transmissions within a sounding burst have been received, then at 1465, the peer node shifts down the contents of the rows in the sounding history, such that all zeros must be placed in the top row of the sounding history and the bottom row discarded. At 1470, timer T3 is reset and restarted. The main loops then goes back to the first decision box at 1420.

It will be further appreciated that, for clarity purposes, the described embodiments of the invention with reference to different functional units and processors may be modified or re-configured with any suitable distribution of functionality between different functional units or processors is possible, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. Examples of the invention may optionally be implemented, at least partly, as computer software running on one or more data processors and/or digital signal processors. For example, the software may reside on non-transitory computer program product comprising executable program code to increase coverage in a wireless communication system.

Thus, the elements and components of an embodiment of the invention may be physically, functionally and logically implemented in any suitable way. Indeed, the functionality may be implemented in a single unit, in a plurality of units or as part of other functional units.

Those skilled in the art will recognize that the functional blocks and/or logic elements herein described may be implemented in an integrated circuit for incorporation into one or more of the communication units. For example, the integrated circuit may be suitable for a wireless communication unit for determining a plurality of link costs for communications to a receiving wireless communication unit using a multiple modulation and coding scheme, MCS in a wireless mesh network. The integrated circuit comprises, in a transmitter operation, a processor that is configured to generate a sounding burst comprising: a plurality of multicast sounding transmissions, wherein each multicast sounding transmission employs a different MCS to be transmitted to the plurality of neighboring wireless communication units; and a plurality of parameters contained at an application layer protocol level. The plurality of parameters in the sounding burst comprises: an intra-burst sequence number for each MCS transmitted within each multicast sounding transmission; an indication of a number of sounding transmissions in the sounding burst; and an index value that references a set of values that are specific to the wireless configuration that the wireless remote communications unit employs and used together with the intra-burst sequence number that identifies a specific sounding transmission within the sounding burst to determine a relative bit rate value associated with each multicast sounding transmission within the sounding burst.

Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

What is claimed is:

1. A wireless communication unit for determining a plurality of communication link cost metrics for communications to a receiving wireless communication unit in a wireless mesh network, the wireless communication unit configured to use a multiple modulation and coding scheme, MCS, and comprising:
    a transmitter configured to transmit sounding transmissions to at least two neighboring wireless communication units of a plurality of neighboring wireless communications units, wherein the wireless mesh network comprises the at least two neighboring wireless communication units forming a respective communication path between the wireless communication unit and the receiving wireless communication unit; and
    a processor coupled to the transmitter and arranged to generate a sounding burst comprising:
    a plurality of multicast sounding transmissions, wherein each multicast sounding transmission employs a different MCS to be transmitted to the plurality of neighboring wireless communication units; and
    a plurality of parameters contained at an application layer protocol level; wherein the plurality of parameters in the sounding burst comprises:
        an intra-burst sequence number for each MCS transmitted within each multicast sounding transmission;
        an indication of a number of sounding transmissions in the sounding burst; and
        an index value that references a set of values that are specific to the wireless configuration that the wireless remote communications unit employs and used together with the intra-burst sequence number that identifies a specific sounding transmission within the sounding burst to determine a relative bit rate value associated with each multicast sounding transmission within the sounding burst.

2. The wireless communication unit of claim 1, wherein the processor generates a further parameter contained at the application layer protocol level in the plurality multicast sounding transmissions of a sounding burst, wherein the further parameter indicates a respective number of an individual multicast sounding transmission that is used in the sounding burst.

3. The wireless communication unit of claim 2, wherein the number of individual multicast sounding transmissions that are used in the sounding burst is a same number value across the plurality of multicast sounding transmissions.

4. The wireless communication unit of claim 1, wherein the intra-burst sequence number for each MCS transmitted within each multicast sounding transmission contains a non-consecutive MCS in each subsequent sounding transmission of the sounding burst.

5. The wireless communication unit of claim 1, wherein the processor generated sequence number for each MCS transmitted within the plurality of multicast sounding transmissions at the application layer protocol level is generated in a MCS rate table that is transmitted in each multicast sounding transmission.

6. The wireless communication unit of claim 5, wherein the MCS rate table is indexed using a parameter that points to a particular table of a previously stored set of tables.

7. The wireless communication unit of claim 6, wherein the MCS rate table parameter comprises a predefined set of MCS rate tables that uses a relative value between a peak bit rate and an individual bit rate contained in a MCS rate table together with predefined MCS rate table indexes.

8. The wireless communication unit of claim 6, wherein the MCS rate table parameter points to a previously defined 802.11 MCS rate table that enables the at least one neighboring wireless communication unit to calculate an Estimate Transmission Time, ETT, cost metric.

9. The wireless communication unit of claim 1, wherein the processor generates the sounding burst comprising the plurality of multicast sounding transmissions by including a sub Type Length Value, TLV, encoding sounding transmission that includes a legacy burst sequence number.

10. A method for determining a plurality of link costs for communications to a receiving wireless communication unit in a wireless mesh network in a wireless communication unit configured to use a multiple modulation and coding scheme, MCS, the method comprising:
transmitting sounding transmissions to at least two neighboring wireless communication units of a plurality of neighboring wireless communications units, wherein the wireless mesh network comprises the at least two neighboring wireless communication units forming a respective communication path between the wireless communication unit and the receiving wireless communication unit; and
generating a sounding burst comprising a plurality of multicast sounding transmissions, wherein each multicast sounding transmission employs a different MCS to be transmitted to the plurality of neighboring wireless communication units; and a plurality of parameters contained at an application layer protocol level;
wherein the plurality of parameters in the sounding burst comprises:
an intra-burst sequence number for each MCS transmitted within each multicast sounding transmission;
an indication of a number of sounding transmissions in the sounding burst; and
an index value that references a set of values that are specific to the wireless configuration that the wireless remote communications unit employs and used together with the intra-burst sequence number that identifies a specific sounding transmission within the sounding burst, to determine a relative bit rate value associated with each multicast sounding transmission within the sounding burst.

11. A receiving wireless communication unit for determining a communication link cost metric from a sounding burst received from a transmitting wireless communication unit received via a plurality of communication links in a wireless mesh network, the receiving wireless communication unit configured to use a multiple modulation and coding scheme, MCS, and comprising:
a receiver configured to receive sounding transmissions from at least two neighboring wireless communication units of a plurality of neighboring wireless communications units, wherein the wireless mesh network comprises the at least two neighboring wireless communication units forming a respective communication path between the transmitting wireless communication unit and the receiving wireless communication unit; and
a processor coupled to the receiver and arranged to receive a sounding burst comprising a plurality of multicast sounding transmissions, wherein each multicast sounding transmission employs a different MCS from respective neighboring wireless communication units of the plurality of neighboring wireless communication units; and each multicast sounding transmission comprises a plurality of parameters contained at an application layer protocol level; wherein the plurality of parameters in the sounding burst comprises:
an intra-burst sequence number for each MCS transmitted within each multicast sounding transmission;
an indication of a number of sounding transmissions in the sounding burst; and
an index value that references a set of values that are specific to the wireless configuration that the wireless remote communications unit employs and used together with the intra-burst sequence number that identifies a specific sounding transmission within the sounding burst to determine a relative bit rate value associated with each multicast sounding transmission within the sounding burst;
wherein the processor is configured to calculate a cost metric for a respective received sounding burst for each of the received sounding transmissions received via the plurality of communication links.

12. The receiving wireless communication unit of claim 11, wherein the processor is configured to calculate an estimate transmission time (ETT) cost metric for the respective received sounding burst for each of the received sounding transmissions received via the plurality of communication links using a relative value between a peak bit rate and an individual bit rate contained in a MCS rate table.

13. The receiving wireless communication unit of claim 11, wherein the processor is further configured to use a relative MCS rate table index contained in the sounding burst together with predefined rate table information to obtain a MCS rate cost metric for all MCS used in sounding burst.

14. The receiving wireless communication unit of claim 12, wherein the processor is further configured to derive a delivery rate from the parameters contained in the sounding transmission and use both the derived delivery rate and a MCS rate to derive a plurality of ETT cost metric values for each MCS used in the sounding burst.

15. The receiving wireless communication unit of claim 11, wherein the processor is further configured to construct a sounding history of transmissions from the transmitting wireless communication unit received via the plurality of communication links using parameters in sounding burst.

16. The receiving wireless communication unit of claim 11, wherein the processor is further configured to derive a packet delivery rate for each MCS for each of the received sounding transmissions received via the plurality of communication links.

17. The receiving wireless communication unit of claim 11, wherein the processor is coupled to a transmitter in the receiving wireless communication unit and the calculated ETT cost metric is transmitted to at least one neighboring wireless communication unit for use by the neighboring wireless communication unit with a conventional routing algorithm to determine a performance for each of a plurality of routes through the wireless mesh network.

18. The wireless communication unit of claim 11, wherein the wireless mesh network complies with at least one of: a WiFi™ 802.11n, a WiFi™ 802.11ac, a WiFi™ 802.11ax standard.

19. A method for determining a plurality of link costs for communications in a wireless mesh network received at a receiving wireless communication unit configured to use a multiple modulation and coding scheme, MCS, the method comprising:
- receiving sounding transmissions from at least two neighboring wireless communication units of a plurality of neighboring wireless communications units, wherein the wireless mesh network comprises the at least two neighboring wireless communication units forming a respective communication path between a transmitting wireless communication unit and the receiving wireless communication unit; and
- receiving and processing a sounding burst comprising a plurality of multicast sounding transmissions, wherein each multicast sounding transmission employs a different MCS from respective neighboring wireless communication units of the plurality of neighboring wireless communication units; and each multicast sounding transmission comprises a plurality of parameters contained at an application layer protocol level; wherein the plurality of parameters in the sounding burst comprises:
  - an intra-burst sequence number for each MCS transmitted within each multicast sounding transmission;
  - an indication of a number of sounding transmissions in the sounding burst; and
  - an index value that references a set of values that are specific to the wireless configuration that the wireless remote communications unit employs and used together with the intra-burst sequence number that identifies a specific sounding transmission within the sounding burst to determine a relative bit rate value associated with each multicast sounding transmission within the sounding burst;
- calculating a cost metric for the respective received sounding burst for each of the received sounding transmissions received via the plurality of communication links.

20. A wireless communication system for determining a plurality of communication link cost metrics comprising a transmitting wireless communication unit for communications to a receiving wireless communication unit in a wireless mesh network, the transmitting wireless communication unit configured to use a multiple modulation and coding scheme, MCS, and comprising:
- a transmitter configured to transmit sounding transmissions to at least two neighboring wireless communication units of a plurality of neighboring wireless communications units, wherein the wireless mesh network comprises the at least two neighboring wireless communication units forming a respective communication path between the transmitting wireless communication unit and the receiving wireless communication unit; and
- a processor coupled to the transmitter and arranged to generate a sounding burst comprising:
- a plurality of multicast sounding transmissions, wherein each multicast sounding transmission employs a different MCS to be transmitted to the plurality of neighboring wireless communication units; and
- a plurality of parameters contained at an application layer protocol level; wherein the plurality of parameters in the sounding burst comprises:
  - an intra-burst sequence number for each MCS transmitted within each multicast sounding transmission;
  - an indication of a number of sounding transmissions in the sounding burst; and
  - an index value that references a set of values that are specific to the wireless configuration that the wireless remote communications unit employs and used together with the intra-burst sequence number that identifies a specific sounding transmission within the sounding burst to determine a relative bit rate value associated with each multicast sounding transmission within the sounding burst;

and wherein the receiving wireless communication unit comprises:
- a receiver configured to receive sounding transmissions from at least two neighboring wireless communication units of a plurality of neighboring wireless communications units, wherein the wireless mesh network comprises the at least two neighboring wireless communication units forming a respective communication path between the transmitting wireless communication unit and the receiving wireless communication unit; and
- a processor coupled to the receiver and arranged to receive the sounding burst,
- wherein the processor is configured to calculate a cost metric for a respective received sounding burst for each of the received sounding transmissions received via the plurality of communication links.

* * * * *